(12) United States Patent
Yano et al.

(10) Patent No.: US 7,310,447 B2
(45) Date of Patent: Dec. 18, 2007

(54) IMAGE PROCESSING APPARATUS, IMAGE PROCESSING METHOD, AND STORAGE MEDIUM

(75) Inventors: Takanori Yano, Kanagawa (JP); Takao Inoue, Kanagawa (JP); Akira Takahashi, Kanagawa (JP); Keiichi Ikebe, Kanagawa (JP); Hiroyuki Sakuyama, Tokyo (JP); Taku Kodama, Kanagawa (JP); Ikuko Yamashiro, Kanagawa (JP); Takashi Maki, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 794 days.

(21) Appl. No.: 10/657,219

(22) Filed: Sep. 5, 2003

(65) Prior Publication Data

US 2005/0036695 A1    Feb. 17, 2005

(30) Foreign Application Priority Data

Sep. 6, 2002  (JP)  .............................. 2002-261739

(51) Int. Cl.
  *G06K 9/36*  (2006.01)
(52) U.S. Cl. ...................... 382/236; 370/335; 370/342; 370/474; 375/240.11; 375/240.16; 375/240.19; 382/166; 382/238; 382/240; 382/248
(58) Field of Classification Search ................ 358/539; 375/240.15, 240.16, 240.17, 240.19, 240.11; 382/166, 233, 236, 240, 243, 248, 232, 238; 370/335, 342, 474
See application file for complete search history.

(56) References Cited

U.S. PATENT DOCUMENTS

| 5,666,161 | A | 9/1997 | Kohiyama et al. |
| 6,256,348 | B1* | 7/2001 | Laczko et al. ........ 375/240.15 |
| 6,697,521 | B2* | 2/2004 | Islam et al. ................ 382/166 |
| 6,871,320 | B1* | 3/2005 | Morihara et al. ........... 715/513 |
| 6,909,810 | B2* | 6/2005 | Maeda ....................... 382/243 |
| 6,993,199 | B2* | 1/2006 | Chebil ....................... 382/240 |
| 7,110,608 | B2* | 9/2006 | Chan et al. ................. 382/239 |

(Continued)

FOREIGN PATENT DOCUMENTS

| JP | 05-064001 | 3/1993 |
| JP | 2002-237132 | 8/2002 |

OTHER PUBLICATIONS

Nomizu, Yasuyuki, "Next-Generation Image Encoding Method JPEG2000," Triceps, Inc., Feb. 13, 2001, Japan (with English Abstract).

Japanese Office Action for JP Appln. No. 2002-261739, mailed Dec. 7, 2006 (2 pages).

*Primary Examiner*—Gregory Desire
(74) *Attorney, Agent, or Firm*—Blakely, Sokoloff, Taylor & Zafman LLP

(57) ABSTRACT

In response to a partial codestream truncation command, a partial codestream truncation process unit temporarily truncates a code line of encoded data. The partial codestream truncation process unit can also temporarily truncate the code line frame by frame. In response to an undo command, a restoration process unit restores the encoded data that has temporarily truncated code line. The temporarily truncated frames are included in a group of frames of the moving image. In response to an undo releasing command, a code line discarding unit discards the temporarily truncated code line or frames. The encoded data has a form of JPEG2000 or Motion-JPEG2000.

41 Claims, 17 Drawing Sheets

U.S. PATENT DOCUMENTS

| | | | |
|---|---|---|---|
| 7,158,682 B2 * | 1/2007 | Sano | 382/236 |
| 7,200,277 B2 * | 4/2007 | Joshi et al. | 382/248 |
| 7,206,804 B1 * | 4/2007 | Deshpande et al. | 709/203 |
| 2001/0017853 A1 * | 8/2001 | Kikuchi et al. | 370/335 |
| 2003/0219162 A1 * | 11/2003 | Sano | 382/240 |
| 2005/0036695 A1 * | 2/2005 | Yano et al. | 382/232 |
| 2005/0201624 A1 * | 9/2005 | Hara et al. | 382/232 |
| 2006/0114861 A1 * | 6/2006 | Kikuchi et al. | 370/335 |
| 2006/0222254 A1 * | 10/2006 | Zandi et al. | 382/240 |

* cited by examiner

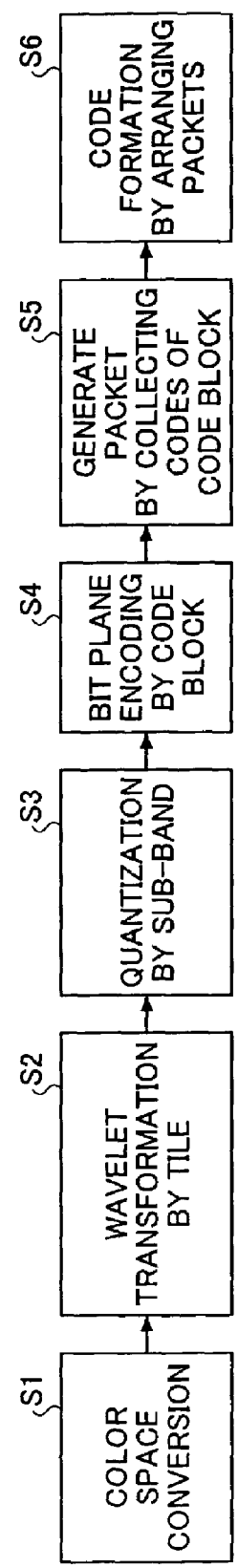

DECOMPOSITION LEVEL 0

DECOMPOSITION LEVEL 1

DECOMPOSITION LEVEL 2

DECOMPOSITION LEVEL 3

CODE FORMAT

| LRCP | PACKET 0 | PACKET 1 | PACKET 2 | PACKET 3 | PACKET 4 | PACKET 5 |
|---|---|---|---|---|---|---|
| | LAYER···0 | LAYER···0 | LAYER···0 | LAYER···0 | LAYER···0 | LAYER···0 |
| | RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| | COMPONENT 0 | COMPONENT 1 | COMPONENT 2 | COMPONENT 0 | COMPONENT 1 | COMPONENT 2 |
| | PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| LAYER···0 | LAYER···0 | LAYER···0 | LAYER···0 | LAYER···0 | LAYER···0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 12 | PACKET 13 | PACKET 14 | PACKET 15 | PACKET 16 | PACKET 17 |
|---|---|---|---|---|---|
| LAYER···0 | LAYER···0 | LAYER···0 | LAYER···0 | LAYER···0 | LAYER···0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 18 | PACKET 19 | PACKET 20 | PACKET 21 | PACKET 22 | PACKET 23 |
|---|---|---|---|---|---|
| LAYER···1 | LAYER···1 | LAYER···1 | LAYER···1 | LAYER···1 | LAYER···1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 24 | PACKET 25 | PACKET 26 | PACKET 27 | PACKET 28 | PACKET 29 |
|---|---|---|---|---|---|
| LAYER···1 | LAYER···1 | LAYER···1 | LAYER···1 | LAYER···1 | LAYER···1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| LAYER···1 | LAYER···1 | LAYER···1 | LAYER···1 | LAYER···1 | LAYER···1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

FIG.13
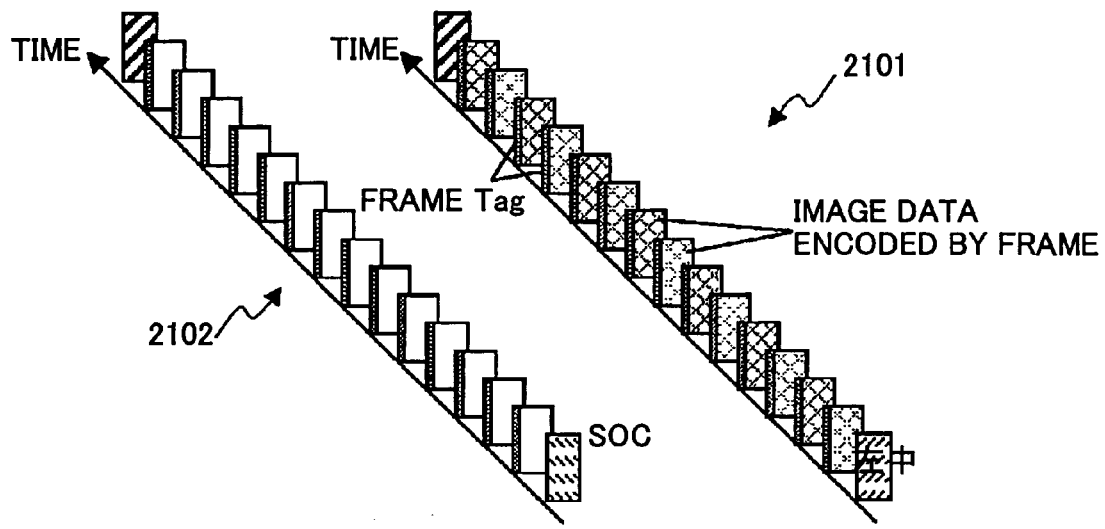
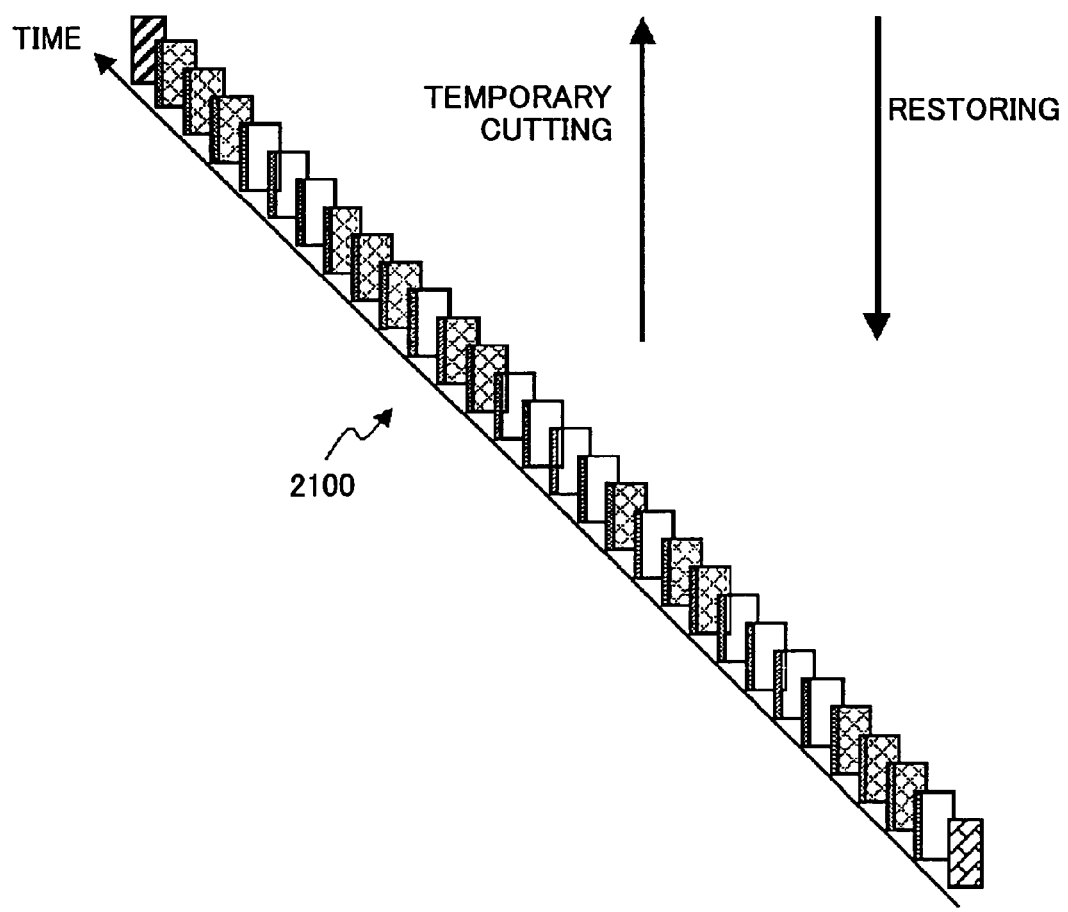

HORIZONTAL DIRECTION CAMERA SHAKE

VERTICAL DIRECTION CAMERA SHAKE

OBLIQUE DIRECTION CAMERA SHAKE

NO CAMERA SHAKE

FIG.17

| | | Name | Code | Main header | Tile-part header |
|---|---|---|---|---|---|
| Delimiting marker segments | Start of codestream | SOC | 0xff4f | ESSENTIAL | NOT ALLOWED |
| | Start of tile-part | SOT | 0xff90 | NOT ALLOWED | ESSENTIAL |
| | Start of data | SOD | 0xff93 | NOT ALLOWED | LAST MARKER |
| | End of codestream | EOC | 0xffd9 | NOT ALLOWED | NOT ALLOWED |
| Fixed information marker segments | Image and tile size | SIZ | 0xff51 | ESSENTIAL | NOT ALLOWED |
| Functional marker segments | Coding style default | COD | 0xff52 | ESSENTIAL | OPTION |
| | Coding style component | COC | 0xff53 | OPTION | OPTION |
| | Region-of-interest | RGN | 0xff5e | OPTION | OPTION |
| | Quantization default | QCD | 0xff5c | ESSENTIAL | OPTION |
| | Quantization component | QCC | 0xff5d | OPTION | OPTION |
| | Progression order change | POC | 0xff5f | OPTION | OPTION |
| Pointer marker segments | Tile-part length, main header | TLM | 0xff55 | OPTION | NOT ALLOWED |
| | Packet length, main header | PLM | 0xff57 | OPTION | NOT ALLOWED |
| | Packet length, tile-part header | PLT | 0xff58 | NOT ALLOWED | OPTION |
| | Packed packet headers, main header | PPM | 0xff60 | OPTION | NOT ALLOWED |
| | Packed packet headers, tile-part header | PPT | 0xff61 | NOT ALLOWED | OPTION |
| In bit stream marker segments | Start of packet | SOP | 0xff91 | NOT ALLOWED | OPTION |
| | End of packet header | EPH | 0xff92 | NOT ALLOWED | OPTION |
| Information marker segments | Component registration | CRG | 0xff63 | OPTION | OPTION |
| | Comment | COM | 0xff64 | OPTION | OPTION |

FIG.18

| SIZ | Lsiz | Rsiz | Xsiz | Ysiz |
|---|---|---|---|---|

| XOsiz | YOsiz | XTsiz | YTsiz |
|---|---|---|---|

| XTOsiz | YTOsiz | Csiz | Ssiz(i) | XRsiz(i) | YRsiz(i) | Ssiz(n) | XRsiz(n) | YRsiz(n) |
|---|---|---|---|---|---|---|---|---|

FIG.19

| COD | Lcod | Scod | SGcod | SPcod |
|---|---|---|---|---|

FIG.20

| COC | Lcoc | Ccoc | Scoc | SPcoc |
|---|---|---|---|---|

FIG.21

| QCD | Lqcd | Sqcd | SPqcd (i) | | SPqcd (n) |
|---|---|---|---|---|---|

FIG.22

| QCC | Lqcc | Cqcc | Sqcc | SPqcc (i) | | SPqcc (n) |
|---|---|---|---|---|---|---|

FIG.23

| COM | Lcom | Rcom | Ccom (i) | | Ccom (n) |
|---|---|---|---|---|---|

IMAGE PROCESSING APPARATUS, IMAGE PROCESSING METHOD, AND STORAGE MEDIUM

The present application claims priority to the corresponding Japanese Application No. 2002-261739 filed on Sep. 6, 2002, the entire contents of which are hereby incorporated by reference.

BACKGROUND OF THE INVENTION

1. Field of the Invention

The present invention relates to an image processing apparatus for a static (still) image or a moving (motion) image, and particularly to an image processing apparatus that processes encoded data of an image in an encoded state.

2. Description of the Related Art

In the case of a digital camera, a digital video camera, a monitoring camera, and a monitoring system, for example, data of an image acquired by such a camera is generally compressed and encoded, and then is stored in a recording medium (or a storage medium). JPEG or MPEG is widely employed as an image compression and encoding method. In a case of JPEG or MPEG, when compressed and encoded image data is further compressed, the compressed and encoded image data is temporarily decoded and expanded (or decompressed at first), and is then compressed and encoded again.

A compression rate of the compression and encoding process is previously set by taking into account the capacity of a storage medium that stores encoded data. For example, according to Japanese Patent Application Laid-Open No. 5-64001, when the size of encoded data is determined to be larger than a memory size, an image processing apparatus decodes and expands the encoded data, and compresses the reproduced image data at a higher compression ratio again.

Recently, JPEG2000 (ISO/IEC FCD 15444-1) and Motion-JPEG2000 (ISO/IEC FCD 15444-3) are widely regarded as a new compression and encoding method that can replace JPEG or MPEG. In the case of JPEG, image degradation occurs at the time of the recompressing due to a generation (a compression type). On the other hand, in a case of data encoded by JPEG2000, a code amount (a compressing rate) can be adjusted in an encoded state, and image degradation due to a generation such as in JPEG does not occur. In the case of Motion-JPEG2000, consecutive plural static images constituting a moving image are handled as respective frames, but encoded data of each frame follows JPEG2000. A detailed description of JPEG2000 is found in "Next Generation Image Encoding Method JPEG2000" (author: Yasuyuki Nomizu, published by Triceps Inc., on Feb. 13, 2001).

When the remaining capacity of a storage medium that stores encoded image data becomes insufficient, there is a case where it is required to decrease the code amount of the encoded data. In this case, in order to determine an appropriate decreasing code amount by taking into account image quality, it is preferable to perform code amount decreasing over again from scratch. However, it is desired to prevent the image quality degradation at the time of the recompression due to a generation.

In the case of determining the contents of the moving image, it is efficient to decrease the number of frames to be reproduced in order to decrease the reproducing time. Particularly, in the case of a moving image acquired by the monitoring camera, if only the frames that include a target person or only the frames that correspond to a target motion can be reproduced, it is possible to efficiently determine the contents of the moving image. Furthermore, in order to determine the contents of the moving image in detail, it is preferable to also reproduce images of the frames that were not reproduced in accordance with a necessity. Meanwhile, it is convenient to appropriately discard frames that are determined as frames having less important contents.

SUMMARY OF THE INVENTION

An image processing method, apparatus and article of manufacture are described. In one embodiment, the image processing apparatus comprises a partial codestream truncating unit to partially truncate ordinarily encoded data of an image to create a truncated codestream, in accordance with a selectively truncation command, and a restoration unit to, in accordance with an undo command, restore the original encoded data from which the truncated code stream was created temporarily by the partial codestream truncating unit.

BRIEF DESCRIPTION OF THE DRAWINGS

FIG. 1 is a block diagram showing a flow diagram of JPEG2000;

FIG. 5 shows an example of division of a packet and a layer;

FIG. 6 shows an example of an arranging order and an interpreting order of packets in a case of an LRCP progression order;

FIG. 13 is an illustration of the frame-by-frame temporary code line cutting and the restoration process of the moving image;

FIG. 17 is a table of a marker and a marker segment;

FIG. 18 shows a configuration of an SIZ marker segment;

FIG. 19 shows a configuration of a COD marker segment;

FIG. 20 shows a configuration of a COC marker segment;

FIG. 21 shows a configuration of a QCD marker segment;

FIG. 22 shows a configuration of a QCC marker segment;

FIG. 23 shows a configuration of a COM marker segment; and

DETAILED DESCRIPTION OF THE PREFERRED EMBODIMENTS

Figure 2A:
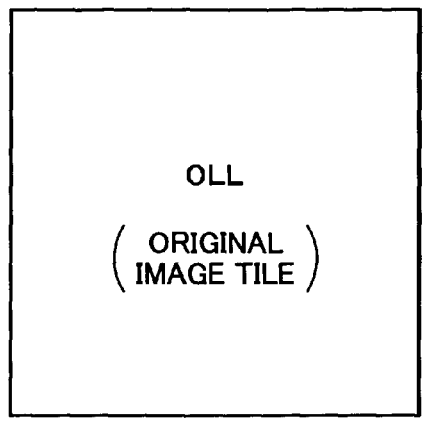
FIGS. 2A through 2D show a two-dimensional wavelet transformation in a case where the decomposition level number is three.

One embodiment of the present invention provides a novel image processing apparatus and image processing method to realize one or more of the desires set forth in the Description of the Related Art section above.

In one embodiment of the present invention, an image processing apparatus comprises a partial codestream truncating unit for partially truncating some form of ordinarily encoded data of an image to create a truncated codestream, in accordance with a selectively truncation command, and a restoring unit for, in accordance with an undo command, restoring the original encoded data from which the truncated code stream was created temporarily by the partial codestream truncating unit.

According to another embodiment of the present invention, the partial codestream truncating unit truncates ordinarily encoded data by turning the original encoded data into second encoded data, causing the truncated codestream to be stored, whereby the second encoded data does not include the truncated codestream, and the restoring unit combines the second encoded data and the stored truncated codestream to restore the original encoded data.

According to another embodiment of the present invention, the partial codestream truncating unit changes original tag information of the original encoded data to second tag information indicating that the truncated codestream is not subjected to decoding, and the restoring unit turns the second tag information back into the original tag information to restore the original encoded data.

According to another embodiment of the present invention, the image is a moving image having a group of frames, the partial codestream truncating unit temporarily truncates, as the truncated codestream, the entire encoded data of at least one frame of the moving image from the group of frames of the moving image to cause the entire encoded data of the at least one frame to be stored, and the restoring unit includes the entire encoded data of the at least one frame in the group of frames of the moving image to restore the original encoded data.

According to another embodiment of the present invention, the image is a moving image having frames, the partial codestream truncating unit adds, to the entire encoded data of at least one frame of the moving image, information indicating that the entire encoded data as the truncated codestream is not subjected to decoding, and the restoring unit discards the information added to the encoded data of the at least one frame to restore the original encoded data.

According to another embodiment of the present invention, encoded data of an image processed by the image processing apparatus or the image processing method is based on JPEG2000 or Motion-JPEG2000, or is based on a format similar to JPEG2000 or Motion-JPEG2000 in which data can be processed in an encoded state.

Other objects, features, and advantages of the present invention will become more apparent from the following detailed description when read in conjunction with the accompanying drawings.

Embodiments of the present invention will now be described in conjunction with the several Figures. In the following embodiments, encoded data of a static image may be based on JPEG2000 (ISO/IEC FCD 15444-1), and encoded data of a moving image may be based on Motion-JPEG2000 (ISO/IEC FCD 15444-3).

An algorithm of JPEG2000 is described in detail in the above-mentioned document, but the algorithm of JPEG2000 is described within a range suitable for describing the following embodiments.

FIG. 1 shows a simplified block diagram for the algorithm of JPEG2000. Each component of the image data that is to be compressed and encoded (in a case of handling a moving image, each component of image data corresponding to each frame) is divided into tiles. The tiles are rectangular regions that do not overlap. The image data is processed by the tile per component. It should be noted that the size of the tile can be made the same size as that of the image, i.e., the process can be performed without dividing the image data into tiles.

In order to improve a compressing ratio, color space conversion from RGB data or CMY data into YCrCb data is performed on a tile image at Step S1 as shown in FIG. 1. However, this color space conversion may be omitted.

At Step S2, two-dimensional wavelet transformation (disperse wavelet transformation DWT) is performed on each tile image of each component after the color space conversion.

Figure 2B:
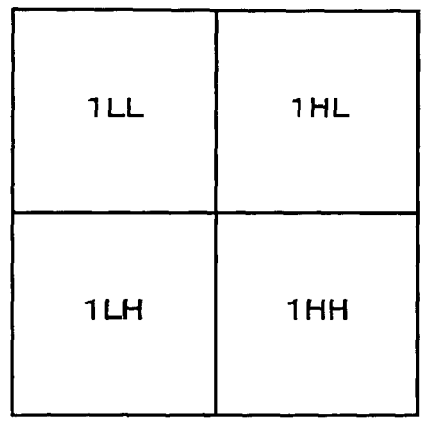
Figure 2C:
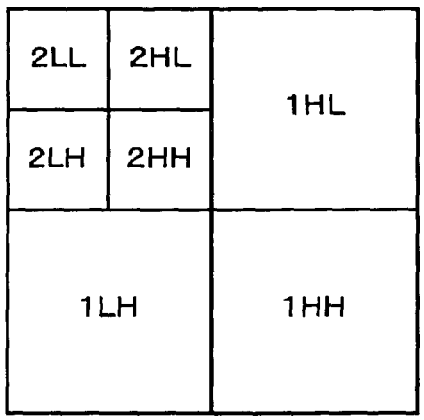
Figure 2D:
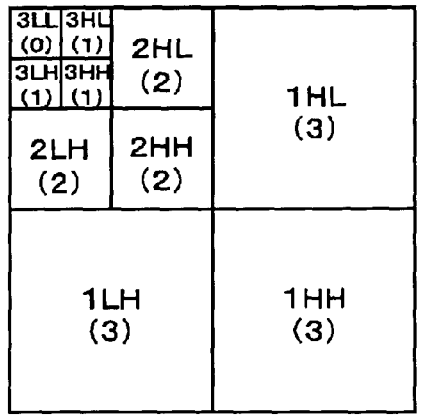

FIGS. 2A through 2D are illustrations of a case in which the decomposition level number is three. The two-dimensional wavelet transformation is performed on a tile image (shown in FIG. 2A) having the decomposition level of zero so that the tile image of FIG. 2A can be divided into sub-bands 1LL, 1HL, 1LH and 1HH, as shown in FIG. 2B. The two-dimensional wavelet transformation is applied to a coefficient of the sub-band 1LL so that the sub-band 1LL can be divided into sub-bands 2LL, 2HL, 2LH and 2HH as shown in FIG. 2C. The two-dimensional wavelet transformation is applied to a coefficient of the sub-band 2LL so that the sub-band 2LL can be divided into sub-bands 3LL, 3HL, 3LH and 3HH as shown in FIG. 2D.

The wavelet coefficients obtained by such octave division of the low frequency component (coefficient of the sub-band LL) is quantized for each sub-band at Step S3. In JPEG2000, it is possible to perform either lossless (reversible) compression or lossy (nonreversible) compression. Further, in JPEG2000, in the case of the lossless compression, the quantizing step width is always "1" so that the quantizing is not performed.

After the quantizing is performed, the coefficient of each sub-band is entropy-encoded at Step S4. In one embodiment, the entropy encoding method is called an EBCOT (Embedded Block Coding with Optimized Truncation) that includes block division, coefficient modeling, and binary arithmetic encoding. In the entropy encoding, a bit-plane of the coefficient of each sub-band after quantizing is encoded from an upper plane to a lower plane by the block called a code block.

The last two steps S5 and S6 are code forming processes. At step S5, the codes created at Step S4 are collected to form a packet. Next, at Step S6, the packets created at Step S5 are arranged in accordance with a progression order, and necessary tag information is added to the arranged packets to form encoded data in a predetermined format. In JPEG2000, five types of progression orders based on combination of a resolution level, a position, a layer, and a component (color component) are defined for encoding order control.

Figure 3:
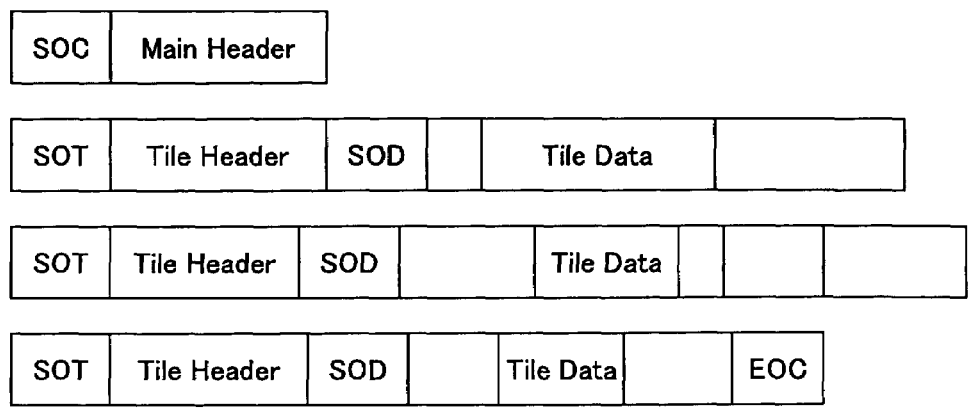
FIG. 3 shows a format of encoded data of JPEG2000.

FIG. 3 shows a format of the JPEG2000 encoded data. As shown in FIG. 3, the encoded data begins with a tag called an SOC marker that indicates the start of the encoded data. Tag information called a main header follows the SOC marker. The main header describes an encoding parameter, a quantizing parameter, and so on. After the main header, the code data of each tile begins with a tag called an SOT marker. The code data of each tile includes tag information called a tile header, a tag called an SOD marker, and tile data having the contents of a code line of each tile. After the last tile data, a tag called an EOC marker is placed for indicating the end. In this specification, the term "code line" means a part of codestream.

According to the JPEG2000 algorithm, image quality is good at a high compression rate (a low bit rate). Such a JPEG2000 algorithm has many characteristics.

As for one characteristic of the JPEG2000 algorithm, it is possible to adjust an entire code amount without performing recompression by performing post-quantization such that the code of the encoded data is truncated (truncated). This code truncation can be performed in various units such as a tile region, a component, a decomposition level (resolution level), a bit plane, a sub-bit plane, a packet, and a layer (in the case of multi-layers). The relation between the decomposition level and the resolution level is shown in FIG. 2D in the way that the numbers in the parentheses indicate the resolution levels of the corresponding sub-bands. As for another characteristic of the JPEG algorithm, encoded data can be easily divided into two or more encoded data in the encoded state, and these encoded data can be combined to restore the original encoded data. As for still another characteristic of the JPEG2000 algorithm, by only rewriting (changing) tag information of encoded data, decoding can be performed as if a part of the code line is actually truncated.

Next, a precinct, a code block, a packet and a layer will be briefly described. There is the following size relation: image size≧tile size≧sub-band size≧precinct size≧code block size.

Figure 4:
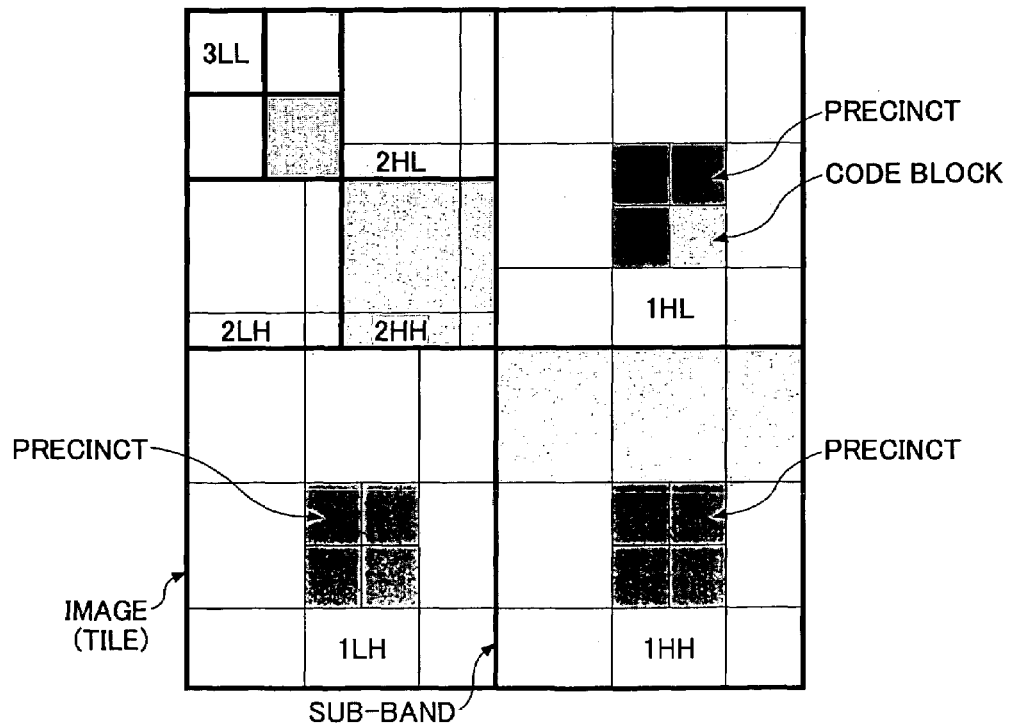
FIG. 4 is an illustration of a precinct and a code block.

A precinct refers to a rectangular region of the sub-bands. As shown in FIG. 4, combination of three regions that are located at the spatially same positions of the sub-bands HL, LH and HH having the same decomposition level is treated as one precinct. However, as for the sub-band LL, one region is treated as one precinct. The size of the precinct can be made equal to the size of the sub-band. A code block is a rectangular region that is created by dividing the precinct. For simplicity, the precinct and one code block at the decomposition level 1 are shown in FIG. 4.

A packet is created by picking up and collecting a part of codes of the all code blocks included in the precinct (for example, the codes of three bit planes from the uppermost bit plane to the third bit plane). A packet having an empty code can be allowed. Thus, the codes of the code blocks are collected to create packets, and the packets are arranged in accordance with a desired progression order to form encoded data. In FIG. 3, tile data (a part for each tile) after the SOD marker corresponds to the gathered packets.

By collecting the packets of the all precincts (i.e., all code blocks, all sub-bands), a part of the codes of the entire image region (for example, this part corresponds to the codes of the uppermost bit plane to the third bit plane of the wavelet coefficients of the entire image region) is created as a layer. However, as shown in the following example, the layer does not necessarily have to include the packets of all precincts. Accordingly, when a larger number of layers are decoded at the time of expanding, the image quality of the reproduced image is more improved. In other words, a layer can be considered as a unit of the image quality. By collecting all layers, the codes of all bit planes of the entire image region are made.

Figure 5:
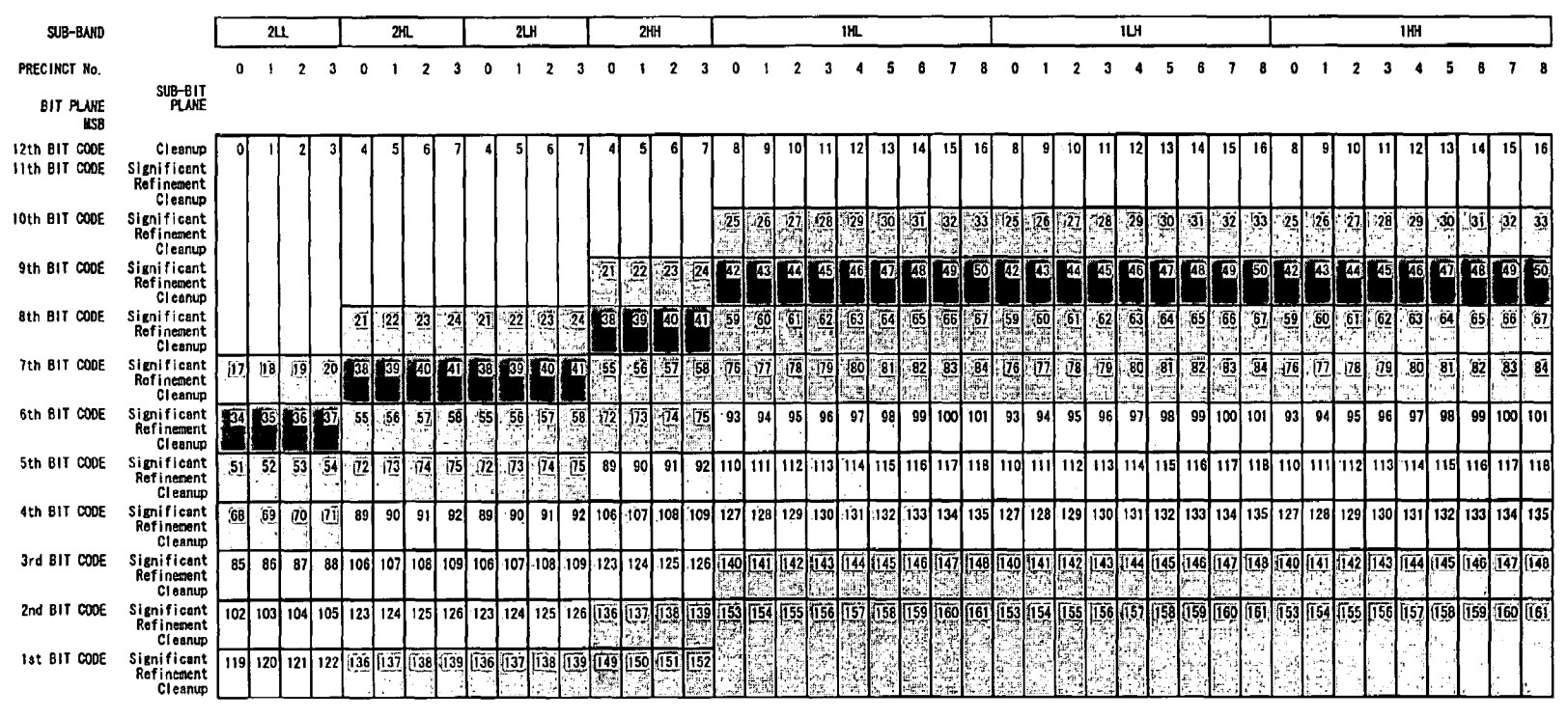

FIG. 5 shows an example of the packets and layers in a case where the decomposition level number is 2 (the resolution level number is 3). In FIG. 5, rectangles having longer lengths in a vertical direction are packets, and the numbers shown in these rectangles are the packet numbers. Layers correspond to rectangles defined with the dark and light coloring, respectively. That is, the codes of the packets having the packet numbers 0 through 16 constitute the layer 0, the codes of the packets having the packet numbers 17 through 33 constitute the layer 1, the codes of the packets having the packet numbers 34 through 50 constitute the layer 2, the codes of the packets having the packet numbers 51 through 67 constitute the layer 3, the codes of the packets having the packet numbers 68 through 84 constitute the layer 4, the codes of the packets having the packet numbers 85 through 101 constitute the layer 5, the codes of the packets having the packet numbers 102 through 118 constitute the layer 6, the codes of the packets having the packet numbers 119 through 135 constitute the layer 7, the codes of the packets having the packet numbers 136 through 148 constitute the layer 8, the codes of the packets having the packet numbers 149 through 161 constitute the layer 9. The corresponding relation between packets and precincts changes depending on a different progression order and the number of divided layers. The layer configuration shown in FIG. 5 is only one example.

JPEG2000 has another characteristic in which a progression order of encoded data can be changed in the encoded state. In JPEG2000, five progression orders LRCP, RLCP, RPCL, PCRL and CPRL are defined where L designates a layer, R a resolution level, G a component, and P a precinct (position).

In a case of the LRCP progression, the packet arrangement order (at the time of the encoding) or the packet interpretation order (at the time of the decoding) is represented as the following for-loop nested in the order of L, R, C, P.

```
for (layer) {
    for (resolution level) {
        for (component) {
            for (precinct) {
                arrange packets: when encoding
                interpret packets: when decoding
            }
        }
    }
}.
```

In a specific example, the image size is 100×100 pixels (without tile dividing), the number of layers is 2, the resolution level is 3 (levels 0 through 2), and the component number is 3, a precinct size is 32×32. In this example, 36 packets are arranged and interpreted in the manner shown in FIG. 6.

Furthermore, in a case of the RLCP progression, the packet arrangement (at the time of the encoding) or the packet interpretation (at the time of the decoding) is performed in the following order:

```
for (resolution level) {
    for (layer) {
        for (component) {
            for (precinct) {
                arrange packets: when encoding
                interpret packets: when decoding
            }
        }
    }
}.
```

Also in cases of the other progression orders, a packet arranging order or a packet interpreting order can be determined by the nested for-loop.

Tag information and rewriting (changing) of the tag information will described later.

In the following, one embodiment of the present invention will be described.

Figure 7:
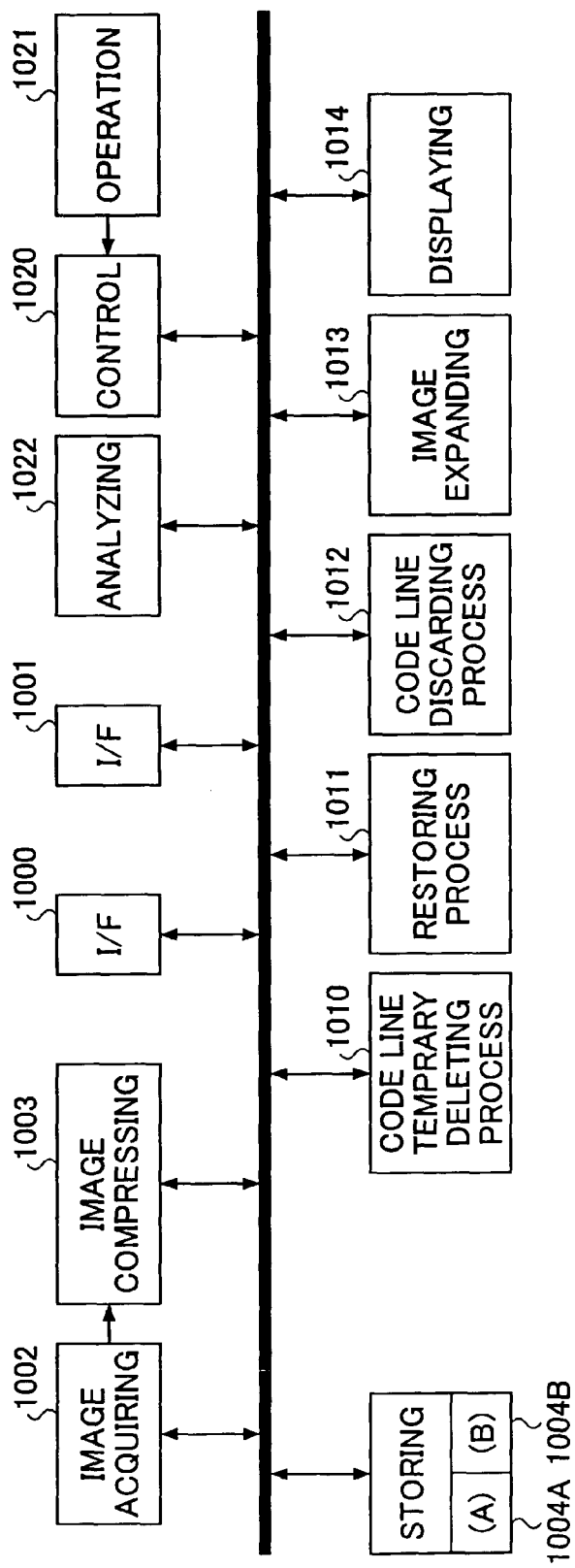
FIG. 7 shows an exemplary configuration of an image processing apparatus according to one embodiment of the present invention.

FIG. 7 is a block diagram of one embodiment of an image processing apparatus. An image processing apparatus having a configuration shown in FIG. 7 includes an interface unit 1000 for inputting encoded data of a static image or a moving image. In one embodiment, the interface unit 1000 directly takes in the encoded data from equipment such as an external personal computer via a wired or wireless transmission line or a network. The image processing apparatus includes another interface unit 1001 that takes in image data from equipment such as an external personal computer via a wired or wireless transmission line or a network. The image processing apparatus further includes an image acquiring unit 1002 (for example, a monitoring camera) that inputs image data of a static image or a moving image by recording a shooting object.

The image processing apparatus further includes an image compressing unit 1003 that is based on JPEG2000 and compresses and encodes the image data input from the interface unit 1001 or the image acquiring unit 1002 to generate encoded data. However, the image processing apparatus may be configured to include only the interface unit 1000. In another embodiment, the image processing apparatus may be configured not to include the image acquiring unit 1002 or not to include the interface unit 1001. Furthermore, according to one embodiment of the present invention, the interface unit 1000 may be replaced with a unit for reading encoded data from a storage medium such a memory card. The image processing apparatus further includes a storage unit (A) 1004A that stores the input encoded data. The image processing apparatus may include other units as shown in FIG. 7.

In the image processing apparatus, a code line temporary truncation process unit 1010 performs the code line temporary deletion process under the control of a control unit 1020. In accordance with a code line truncation command (selectively truncation command), the code line temporary truncation process unit 1010 reads from the storage unit (A) 1004A input encoded data or encoded data restored by a restoration process, truncates a truncating target code line (a part of the original code line) from the original code line, creates second encoded data in which the truncating target code line is truncated from the original code line), overwrites the second encoded data of the original encoded data on the original encoded data stored in the storage unit (A) 1004A, and stores the truncated code line in a storage unit (B) 1004B. The storage unit (A) 1004A and the storage unit (B) 1004B do not need to be physically independent of each other, and may be assigned to different storing regions, respectively, in the same storage unit. The truncated code line may be stored in any form, but in the first embodiment, the code line temporary truncation process unit 1010 creates the encoded data having only the truncated code line in a JPEG2000 format for the restoration process, and the storage unit (B) 1004B stores this encoded data created by the code line temporary truncation process unit 1010. The code line temporary truncation process unit 1010 also can perform the code line deletion (temporary culling of the frames) by the frame (by the image) for a moving image (i.e., by the unit of a frame). In this case, original encoded data of frames of the moving image is stored in the storage unit (B) 1004B, and the original encoded data of the frames stored in the storage unit (A) 1004A is truncated. That is, these frames are actually truncated from a group of frames of the moving image.

A restoration process unit 1011 of the image processing apparatus functions to, under the control of the control unit 1020, restore encoded data that is data before the code line temporary truncation process is performed. In accordance with an undo command, the restoration process unit 1011 reads the encoded data stored in the storage unit (A) 1004A on which the code line temporary truncating has been performed, and the encoded data that consists of the truncated code line stored in the storage unit (B) 1004B. The restoration process unit then combines the encoded data that has undergone the code line temporary truncation process with the encoded data that consists of the truncated code line to restore the original (input) encoded data. The restored encoded data is overwritten on the encoded data in the storage unit (A) 1004A on which the code line temporary truncation process has been performed, and the encoded data that consists of the truncated code line is erased from the storage unit (B) 1004B. In a case where frames of a moving image are temporarily cut by the code line temporary truncation process, the encoded data of the frames restored by the restoration process unit is simply written in the storage unit (A) 1004A, and the encoded data of the temporarily cut (truncated) frames stored in the storage unit (B) 1004B is only erased. This means that the temporarily cut frames are made to return to the group of frames of the moving image.

A code line discarding process unit 1012 functions to discard the temporarily truncated code line under the control of the control unit 1020. Under the control of the control unit 1020, the code line discarding process unit 1012 erases the encoded data stored in the storage unit (B) 1004B that consists of the encoded code line truncated by the code line temporary truncation process. After the code line discarding process is performed, it becomes impossible to restore the original encoded data that includes the discarded code line. In a case of the temporarily cut frames, after the code line discarding process is performed, it becomes impossible to restore the discarded frames.

An image expanding unit 1013 functions to decode and expand the encoded data stored in the storage unit (A) 1004A in accordance with the algorithm of JPEG2000 (or Motion-JPEG2000) to reproduce the image data. The reproduced image data is displayed as an image by a displaying unit 1014. The displaying unit 1014 is used not only for displaying the reproduced image but also for image selecting or information exchanging with a user.

The control unit 1020 functions to control an operation of the image processing apparatus and/or an operation of each unit of the image processing apparatus. An operation unit 1021 is input units that are operated by the user, and is used for inputting to the control unit 1020 an image selecting instruction, a code line truncating instruction, a code line truncating method (a unit of truncating), an undo instruction, an undo releasing instruction, and so on. An analyzing unit 1022 functions to analyze the encoded data to obtain information for selecting frames to be temporarily cut. The control unit 1020 issues a code line truncation command, an undo command, and an undo releasing command in accordance with the information obtained by the analyzing of the analyzing unit 1022.

The code line temporally truncation process unit 1010, the restoration unit 1011, the code line discarding process unit 1012, the analyzing unit 1022, and so on may be realized as hardware, but may be realized as software by using a general-purpose computer such as a personal computer, or a special computer such as a micro computer. Similarly, the control unit 1020, the image compressing unit 1003, and the image expanding unit 1013 may be realized as hardware and/or software. Further, these units may be realized as combination of hardware and software. The scope of the present invention includes programs for these units, and a computer-readable storing (recording) medium that stores the programs. Such scope of the present invention applies to a second embodiment (described later) of the present invention.

Next, an operation of the image processing apparatus will be described.

Figure 8:
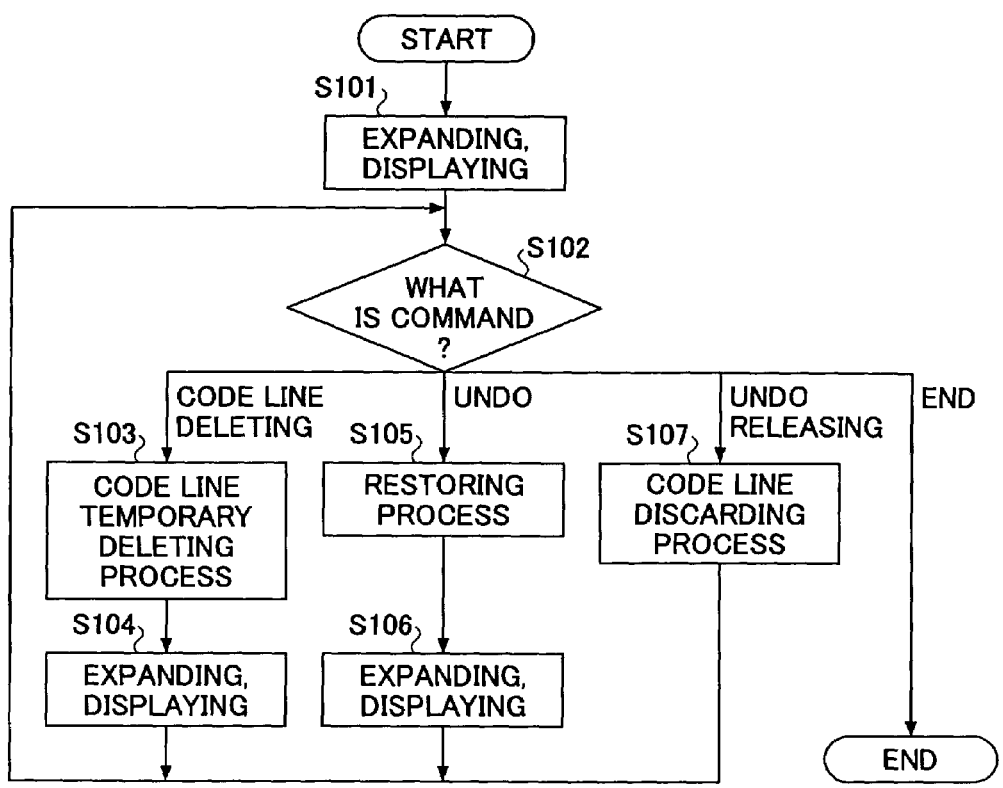
FIG. 8 is a flowchart showing an operation mode that includes performing a partial codestream truncation process, a restoration process, and a code line discarding process for individual images.

First, an operation mode (1-1) in which a user specifies encoded data of one image (for example, one static image or one frame of a moving image), and the code line truncating of the specified encoded data is performed while the user can confirm a result of the code line truncating. FIG. 8 shows a flowchart of this operation mode (1-1).

When an image (for example, one frame of a moving image) is specified, encoded data of the specified image is read from the storage unit (A) 1004A, and decoded and expanded by the image expanding unit 1013 so that the reproduced image data can be displayed on the displaying unit 1014 at Step S101.

When the user determines a necessity or desire to perform the code line truncating by viewing the displayed image, the user specifies a truncating method, and inputs the code line temporary truncating instruction. In one embodiment, specifying the code line truncating method means specifying a unit to be truncated. Specifically, for example, specifying the code line truncating method means specifying code line truncating by the layer (the number of layers to be truncated), code line truncating by the resolution level (the resolution level number to be truncated), code line truncating by the bit plane (the bit plane number to be truncated), or code line truncating by the component (a component to be truncated). The user can select a code line truncating unit (e.g., a layer, the resolution level number, and so on) by inputting an instruction indication such a unit.

The control unit 1020 determines the contents of the input from the user at Step S102, and performs control in accordance with the contents of the input.

When the input from the user is the code line truncating instruction, the code line truncation command that includes information about the code line truncating method specified by the user is issued from the control unit 1020 to the code line temporary truncation process unit 1010 so that the code line temporary truncation process can be performed on the encoded data in accordance with the code line truncating method specified by the user under the control of the control unit 1020. Next, under the control of the control unit 1020, the encoded data in which the truncating target code line has been truncated by the code line temporary truncation process is read from the storage unit (A) 1004A, and is decoded and expanded by the image expanding unit 1013, and the decoded and expanded image data is displayed on the displaying unit 1014 at Step S104.

The user can confirm quality of the displayed image. When the user wants to perform the code line truncation process over again from scratch, the user can input an undo instruction. On the other hand, when the user wants to fix the result of the current code line truncation process, the user can input an undo releasing instruction. Further, when the user wants to end the operation, the user can input the end instruction.

When an undo instruction is input, an undo command is issued from the control unit 1020 to the restoration process unit 1011, and the restoration process is performed by the restoration process unit 1011 at Step S105. Then, under the control of the control unit 1020, the restored encoded data (i.e., the original encoded data before the code line truncation process is performed) is read from the storage unit (A) 1004A, and is decoded and expanded in the image expanding unit 1013, and the decoded and expanded image is displayed on the displaying unit 1014 at Step S106. The user can input the code line truncation command again with a different code truncating method for the encoded data.

In this manner, the user can repeatedly cut a code amount of the encoded data. Since the encoded data is not recompressed, the image degradation caused by a generation does not occur.

When an undo releasing instruction is input from the user, an undo releasing command is issued from the control unit 1020 to the code line discarding process unit 1012 where the code line discarding process is performed at Step S107. In other words, the encoded data stored in the storage unit (B) 1004B that consists of the truncating target code line truncated from the original code line is erased. Accordingly, the original encoded data that has the truncating target code line can be no longer restored.

When the code amount of the encoded data is cut for shortage of an available capacity of the storage unit (A) 1004A, the code line discarding process is performed so that the available capacity of the storage unit (A) 1004A can be increased.

After the code line temporary truncation process is performed, the end instruction may be input to end the operation. However, at another time point, this operation mode (1-1) may be used again, and an undo command or an undo releasing command may be input for the encoded data for which the operation was ended so that the restoration process or the code line discarding process can be performed.

Figure 9:
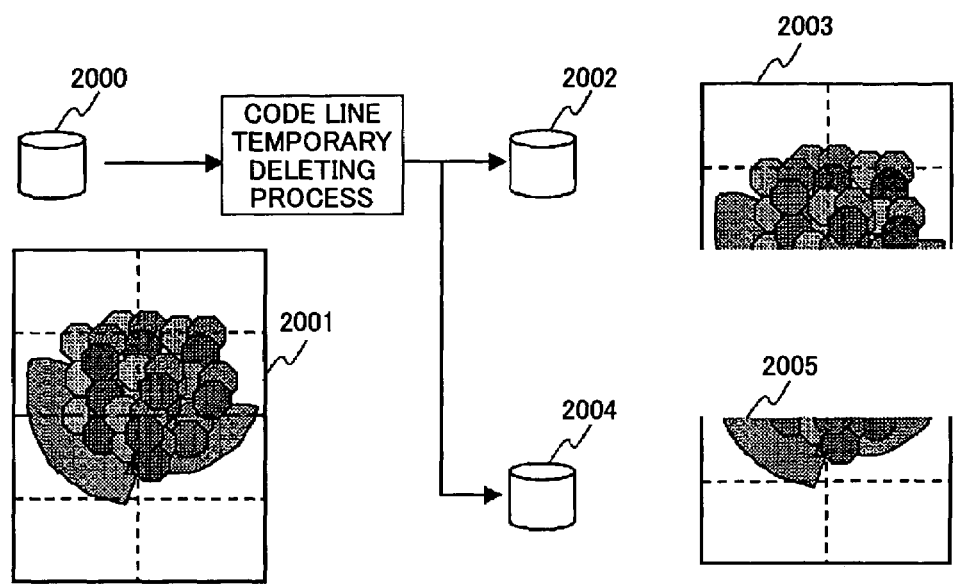
FIG. 9 is an illustration of a code line temporary truncation process.
Figure 10:
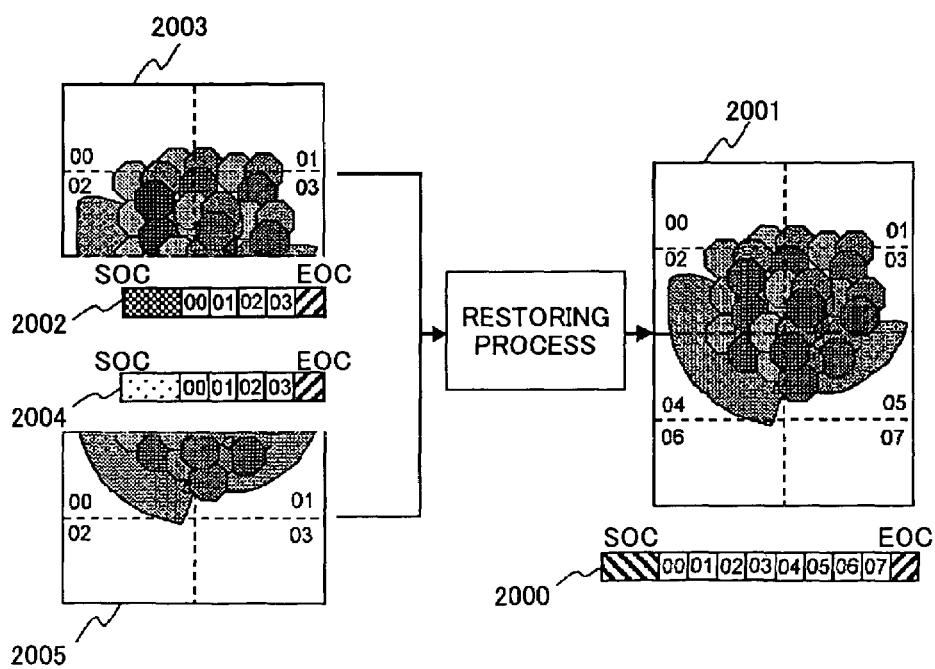
FIG. 10 is an illustration of a restoration process.

FIGS. 9 and 10 are illustrations plainly showing an exemplary code line temporary truncation process that is performed by the tile, and the restoration process, respectively. As shown in FIG. 9, the code line temporary truncation process converts encoded data 2000 of an image 2001 into encoded data 2002 of an image 2003 such that four tiles at the lower half part of the image 2001 are truncated in the image 2003. A code line of an image 2005 having the four tiles of the lower half part of the image 2001 is stored as encoded data 2004. When an undo instruction is input, as shown in FIG. 10, the restoration process combines the encoded data 2002 and the encoded data 2004 to restore the original encoded data 2000. In this example, when an undo releasing instruction is input after the code line temporary truncation process, the encoded data 2004 is discarded, so that it becomes impossible to restore the original encoded data 2000. It should be noted that after the code line discarding process, the code line temporary truncation process can be performed on the encoded data 2002 again.

Furthermore, when inputting the code line truncating instruction, it is also possible to instruct a progression order change of the encoded data in accordance with a necessity. When the instruction for the progression order change is provided, the code line temporary truncation process unit 1010 changes the progression order before performing the code line temporary truncation process.

Figure 11:
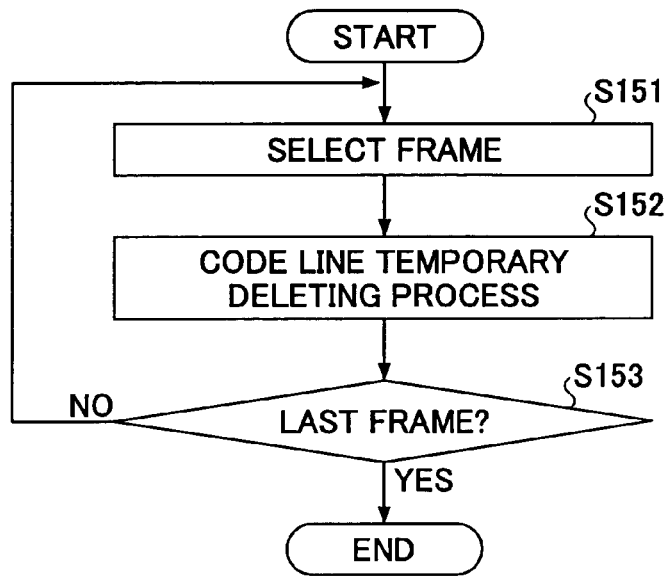
FIG. 11 is a flowchart showing an operation mode that includes successively performing the code line temporary truncation process for frames of a moving image.

The image processing apparatus has an operation mode (1-2) in which the same code line temporary truncation process as in the operation mode (1-1) is performed on all frames of a moving image in the form of Motion-JPEG2000. FIG. 11 is a flowchart of the operation mode (1-2).

At Step S151, the encoded data in the storage unit (A) 1004A is selected such that the encoded data of a beginning frame is first selected. At Step S152, the code line truncation command corresponding to a default code line truncating method or a code line truncating method specified by the user is issued from the control unit 1020, and the code line temporary process unit 1010 performs the code line temporary truncation process on the encoded data of the selected frame. Steps S151 and S152 are repeated, and when the last frame is processed (Yes in Step S153), this operation mode is terminated.

The image processing apparatus also has an operation mode (1-3) of restoring the encoded data of all frames processed by the code line temporary truncation process in the operation mode (1-2). A flowchart of this operation mode (1-3) is omitted, but an undo command may be issued from the control unit 1020, and under the control of the control unit 1020, the restoration process unit 1011 performs the restoration process by the frame of the moving image.

The image processing apparatus also has an operation mode (1-4) of discarding the code lines of the all frames of the moving image that have been temporarily truncated in the operation mode (1-2). The flowchart of this operation mode (1-4) is omitted, but an undo releasing command is issued from the control unit 1020, and under the control of the control unit 1020, the encoded data in the storage unit (B) 1004B that consists of the truncated code lines of the frames is erased. After that, the original encoded data of the frames cannot be restored.

Figure 12:
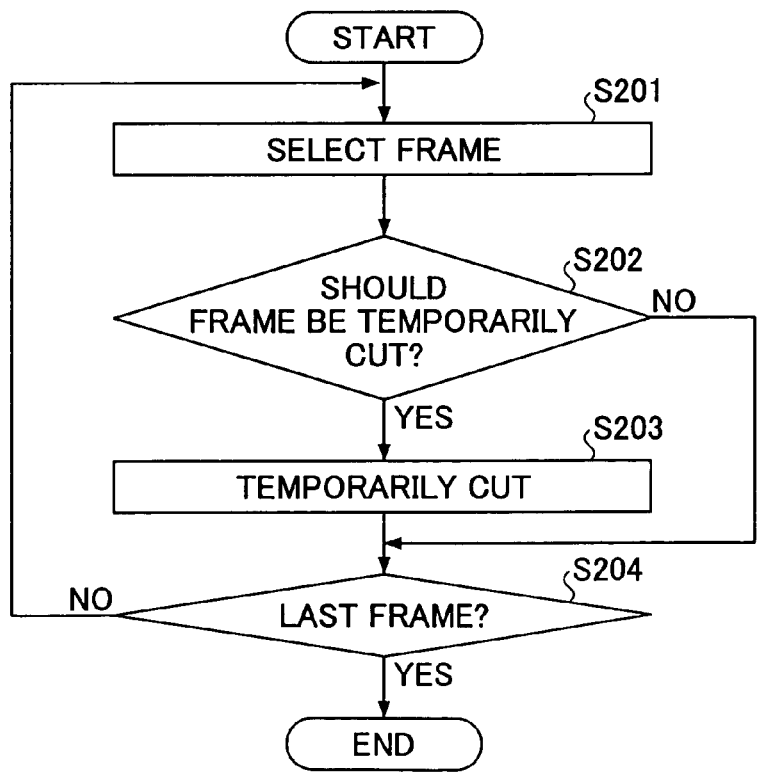
FIG. 12 is a flowchart showing an operation mode that includes temporarily cutting, successively, frames by the frame of a moving image.

The image processing apparatus also has an operation mode (1-5) of temporarily cutting frames (performing a frame-by-frame code line temporary truncating) for encoded data of a moving image in the form of Motion-JPEG2000. FIG. 12 is a flowchart of this operation mode (1-5). The user previously selects the method of selecting frames to be temporarily cut. For example, as the method of selecting frames to be temporarily cut, there are a method of selecting every Nth ($\geq 1$) frame, a method of selecting frames that are less different from the preceding frames (i.e., selecting a frame with less movement), a method of selecting frames corresponding to images having large camera vibration out of the moving image, and a method of selecting frames that do not include a person.

At Step S201, from a beginning frame, the control unit 1020 successively selects a frame out of a moving image whose encoded data is stored in the storage unit (A) 1004A, and determines whether or not the selected frame should be temporarily truncated at Step S202. For example, when the method of temporarily selecting every Nth frame is selected, the control unit 1020 makes this determination based on the frame number. When the method of temporarily selecting frames less different from the preceding frames (frames with less movement), or the method of temporarily selecting large camera-shake frames is selected, the control unit 1020 makes this determination based on a analyzing result of the analyzing unit 1022. The operation of the analyzing unit 1022 will be described later.

At Step S203, the frame-by-frame code line temporary truncation command for the frame that is determined to be temporarily truncated is issued from the control unit 1020, and the frame-by-frame code line temporary truncation process is performed on the encoded data of this frame in the code line temporary truncation process unit 1010. Specifically, in the frame-by-frame code line temporary truncation process, the encoded data of the temporarily truncated (selected) frame is stored in the storage unit (B) 1004B, and the encoded data in the storage unit (A) 1004A corresponding to the selected frame is erased. That is, this frame is truncated from the group of frames of the moving image, but the encoded data of this truncated frame is stored. In this manner, the processes of Steps S201, S202, and S203 are repeated until the operation reaches the last frame. When the last frame is processed (Yes at Step S204), the procedure of this operation mode is terminated.

The image processing apparatus further has an operation mode (1-6) of reproducing a group of frames accumulated in the storage unit (A) 1004A. A flowchart of this operation mode (1-6) is omitted. However, in this operation mode (1-6), under the control of the control unit 1020, the encoded data of the frames in the group of frames of the moving image stored in the storage unit (A) 1004A is successively decoded and expanded so that the reproduced frame images can be displayed on the displaying unit 1014.

After the temporary frame cutting is performed on every Nth frame or the frames with less movement of the moving image in the operation mode (1-5), if the image processing apparatus is made to operate in the operation mode (1-6), confirming the contents of the moving image requires an amount of time shorter than the amount of time required when the temporary frame cutting is not performed. Particularly, in a case of a moving image acquired by a monitoring camera, by temporarily cutting frames with less movement or frames that do not include a person, the contents of the moving image can be confirmed effectively.

The image processing apparatus further has an operation mode (1-7) of restoring the original encoded data from a state where frames have been temporarily cut (i.e., including the encoded data of cut frames in the group of frames). A flowchart of this operation mode (1-7) is omitted. However, an undo command is issued from the control unit 1020, and under the control of the control unit 1020, the encoded data of the temporarily cut frames stored in the storage unit (B) 1004B is written in the storage unit (A) 1004A by the restoration process unit 1011, and the encoded data in the storage unit (B) 1004B corresponding to the encoded data written in the storage unit (A) 1004A is erased. After this restoration process is performed, it becomes possible to reproduce the original moving image by using the operation mode (1-6). Furthermore, after the restoration process is performed, another method of temporarily cutting frames can be specified to temporarily cut frames by using the operation mode (1-5).

As described above, after the code line temporary cutting is performed so that the contents of a moving image can be confirmed efficiently, it is possible to restore all frames of the moving image in a complete state.

Furthermore, in the operation mode (1-1), the temporarily cut frames can be specified one by one to include the specified frame in the group of frames. This is advantageous when the user wants to include the temporarily cut frame determined to be included in an important section of the moving image after the user confirms the contents of the moving image.

FIG. 13 is an illustration of temporary cutting and restoring of frames of a moving image. In FIG. 13, the reference number 2100 designates a group of frames of the moving image before frames are temporarily cut. When the temporary frame cutting process is performed in the operation mode (1-5), for example, encoded data of frames having a mesh pattern in the group of frames 2100 is temporarily cut, and an encoded data line 2101 of the cut frames having the mesh pattern is stored in the storage unit (B) 1004B. An encoded data line 2102 of the frames that exclude the temporarily cut frames having the mesh pattern remains in the storage unit (A) 1004A. Thereafter, when the restoration process is performed in the operation mode (1-7), the encoded data line 2101 of the temporarily cut frames is included in (returned to) the storage unit (A) 1004A to restore the original group of frames 2100.

The image processing apparatus still further has an operation mode (1-8) of discarding the encoded data of all frames that are temporarily cut. A flowchart of this operation mode (1-8) is omitted. However, an undo releasing command is issued from the control unit 1020, and under the control of the control unit 1020, the encoded data of the frames that have been temporarily cut and stored in the storage unit (B) 1004B is erased by the code line discarding process unit 1012. After the code line discarding process is performed, it becomes impossible to restore the encoded data of the temporarily cut frames.

It should be noted that the code line temporary truncation process can be performed in the operation mode (1-2) for the moving image that has undergone the code line discarding process. That is, a combination of the frame cutting and the code line truncating of each frame can be applied to the moving image.

As another example, the code line temporary truncating may be performed on all frames of a moving image in the operation mode (1-2), and the code line discarding process may then be performed in the operation mode (1-4). Thereafter, the frame temporary cutting may be performed in the operation mode (1-5).

Next, the analyzing unit 1022 will be described. The analyzing unit 1022 includes an analyzing unit for identifying a frame with less movement, an analyzing unit for identifying a large camera-shake frame, and/or an analyzing unit for identifying a frame that does not include a person.

The analyzing unit for identifying a frame with less movement compare a code amount (excluding an amount for tag information) of encoded data of each current frame with a code amount of encoded data of the preceding frame when inputting the encoded data of the moving image. When a difference between the code amount of encoded data of a current frame and the code amount of the encoded data of the preceding frame is smaller than a threshold value, the current frame is determined as the frame with less movement. In a section including an acquired largely moving scene, a code amount largely changes between frames. On the other hand, in a section including an acquired less moving scene, a code amount less change between frames. A suitable method for estimating a code amount includes a method of estimating a code amount of the entire image region, a method of estimating a code amount of a specific image region (for example, a center part of the image, and a method of estimating a code amount of a specific component. Alternatively, in a case where image data of a moving image is input, the analyzing unit for identifying an image with less movement can analyze the input image data to detect moving between consecutive frames. The scope of the present invention also includes this operation.

The analyzing unit for identifying a large camera-shake frame determined a camera-shake degree of each frame based on wavelet coefficients obtained in a process of compressing and encoding each frame by the image compression unit 1003. For example, in a case of performing the two-dimensional wavelet transformation by the decomposition level of 3, sub-band coefficients as shown in FIG. 2D can be obtained. The coefficients of the sub-bands HL are high-frequency components in a vertical direction of the image, and the coefficients of the sub-bands LH are high-frequency components in a horizontal direction of the image. A high-frequency component amount Yv used for a measure of the high-frequency component in the vertical direction is calculated by the following equation (1), using the coefficients of the sub-bands HL at respective levels shown in FIG. 2D. A high-frequency component amount Yh used for a measure of the high-frequency component in the horizontal direction is calculated by the following equation (2), using the coefficients of the sub-bands LH at respective levels.

The equation (1) is:

$$Yv = av \cdot \Sigma |1HL| + by \cdot \Sigma |2HL| + cv \cdot \Sigma |3HL|.$$

The equation (2) is:

$$Yh = ah \cdot \Sigma |1LH| + bh \cdot \Sigma |2LH| + ch \cdot \Sigma |3LH|.$$

In the equations (1) and (2), av, by, cv, ah, bh, and ch are constants equal to or larger than 0.

In this example, the decomposition level number is 3. However, when the decomposition level number is larger or smaller than 3, the high-frequency component amounts can be calculated by using similar equations. Furthermore, the coefficients of the sub-bands at a part of levels (for example, only at the level 1) may be used. Additionally, the equations may be modified.

A main shooting object is generally located at a center part of the image, and the other part or background of the image is often out-of-focus. Accordingly, only the wavelet coefficients corresponding to the center part of the image may be used for calculating the high-frequency component amounts. However, the coefficients corresponding to the entire image may be used for calculating the high-frequency component amounts.

Figure 14A:
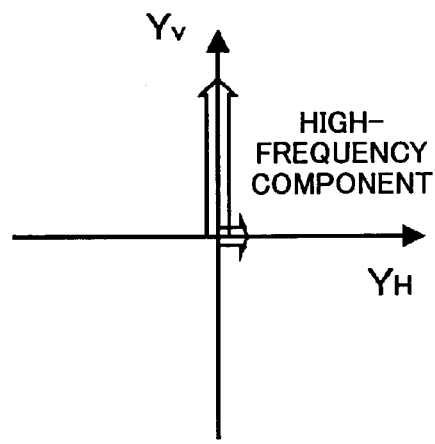
FIGS. 14A through 14D show a relationship between camera vibration and a high-frequency component amount in each direction.
Figure 14B:
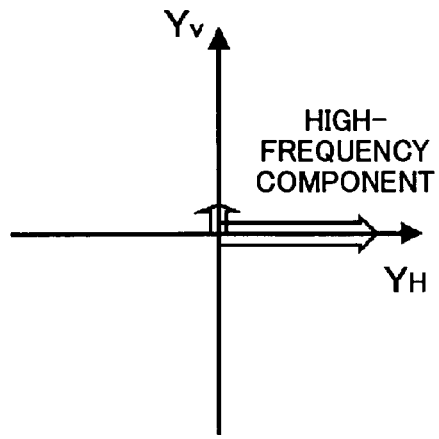
Figure 14C:
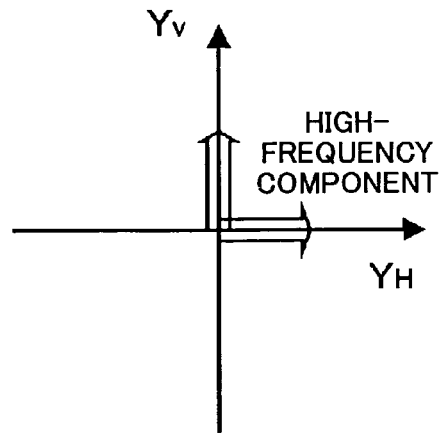
Figure 14D:
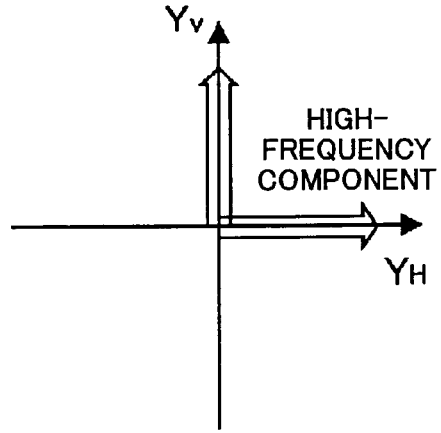

The high-frequency component amounts calculated according to the above-described manner have a relation with camera vibration as shown in FIGS. 14A through 14D. When camera vibration does not exist, both of the high-frequency component amount Yv in the vertical direction and the high-frequency component amount Yh in the horizontal direction are large, and a difference between the high-frequency component amounts Yv and Yh is not so large, as shown in FIG. 14D. When camera vibration exists in the horizontal direction, the high-frequency component amount Yh in the horizontal direction is greatly decreased compared with a case where camera vibration does not exist, as shown in FIG. 14A. When camera vibration exists in the vertical direction, the high-frequency component amount Yv in the vertical direction is greatly decreased as shown in FIG. 14B. When camera vibration exists in an oblique direction, both of the high-frequency component amounts Yv and Yh are decreased as shown in FIG. 14C. By taking advantage of such nature of camera vibration, based on values of the high-frequency component amounts Yv and Yh, the analyzing unit for identifying a large camera-shake frame can determine whether camera vibration of each frame is large or small.

Furthermore, the similar relation for camera vibration is often recognized between code amounts of the sub-bands HL and LH of encoded data, so that the analyzing unit can perform the camera-shake determination based on such code amounts. The scope of the present invention includes this operation. When the image acquiring unit 1002 includes a camera vibration detection sensor such as an accelerator sensor, the analyzing unit may identify a large camera-shake frame based on an output of the camera-shake detection sensor. The scope of the present invention includes this configuration.

The analyzing unit for identifying a frame that does not include a person perform a process of recognizing a person's face for image data of each frame input from the image acquiring unit 1021 or the interface unit 1001. At this time, the frame in which a person's face is not recognized is determined as a frame that does not include a person. In the case where the image acquiring unit 1021 detects a color temperature for automatic white balance adjustment, when the detected color temperature of the frame is close to a flesh color of a person, this frame may be determined as a frame that includes a person. When the detected color temperature of the frame is far away from the flesh color, this frame may be determined as a frame that does not include a person. The scope of the present invention includes this process and a configuration for this process.

An analyzing result of at least one of the above-described respective analyzing units may be stored in storage such as an inside memory of the analyzing unit 1022 or the control unit 1020, and/or the storage unit (B) 1004B.

Next, another embodiment of the present invention will be described.

In a case of a JPEG2000 code, packets are arranged in an order determined by the above-described nested for-loop corresponding to a progression order. Accordingly, for example, in a case of the LRCP progression, if tag information is rewritten such that a for-loop of a layer is executed only two times, packets of only the layers 0 and 1 are handled at the side of a decoder, so that the decoding is partially performed. Similarly, in a case of the RLCP progression, if tag information is rewritten such that a for-loop of a resolution is executed only two times, packets of only the resolution levels 0 and 1 are decoded at the side of the decoder.

Thus, in the case of JPEG2000 code, by manipulating the operation of rewriting tag information, the decoding can be partially performed at the side of the decoder. In other words, although a part of the original code line is not actually truncated, the decoder is made to determine that the part of the original code line has been truncated.

Information required to be rewritten to accurately perform this partial decoding is the number of the uppermost elements in the progression order, and the related information. The uppermost element is an element of a for-loop that is at the most outer side out of nested for-loops. For example, in the case of the LRCP progression, the uppermost element is a layer, and in the case of the RLCP progression, the uppermost element is a resolution.

In the second embodiment, the code line temporary truncation process is performed by rewriting tag information. The decoding process is performed by returning the rewritten tag information into the tag information having the contents before the rewriting. The code line discarding process is performed such that truncating target code lines are actually truncated and discarded from the encoded data after the code line temporary truncating is performed.

Figure 15:
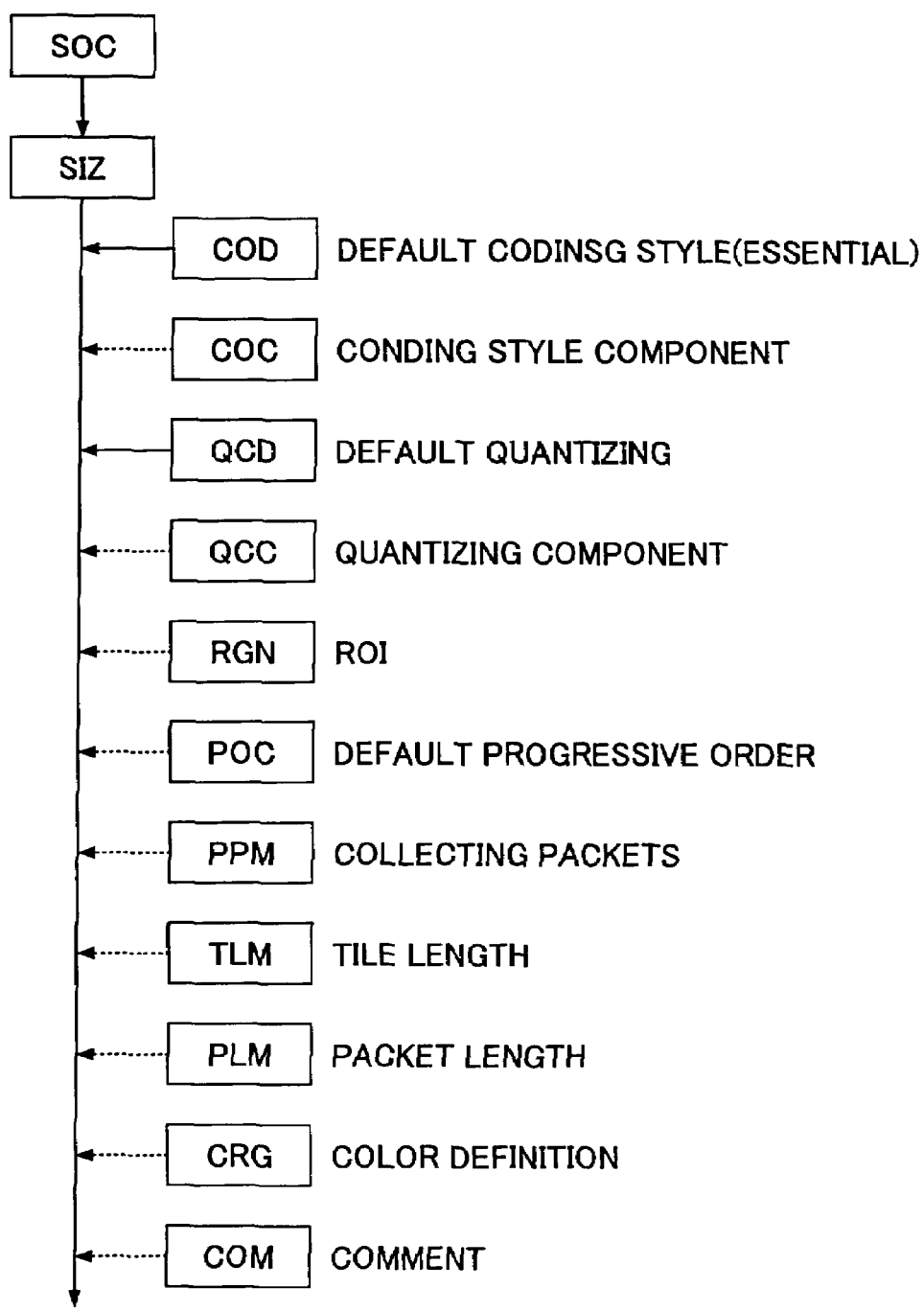
FIG. 15 shows a configuration of a main header.

In the following, an outline of tag information added to encoded data of JPEG2000 will be described within an exemplary range. FIG. 15 shows a configuration of a main header. Marker segments of SIZ, COD and QCD are essential segments, but the other marker segments are optional segments.

Figure 16A:
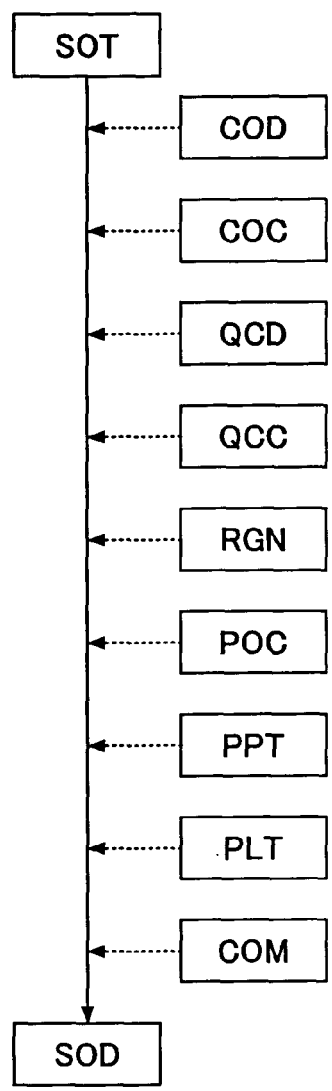
FIGS. 16A and 16B show a configuration of a tile header.
Figure 16B:
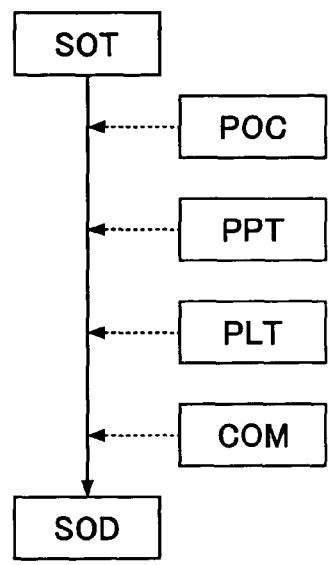

FIGS. 16A and 16B show a configuration of a tile header. FIG. 16A shows a header added to a head of tile data, and FIG. 16B shows a header added to a head of a divided partial tile line when a tile is divided into a plurality of parts. There is no essential tile marker segment in the tile header, and all tile marker segments are optional.

FIG. 17 shows a list of markers and marker segments. A configuration of an SIZ marker segment is shown in FIG. 18, a configuration of a COD marker segment is shown in FIG. 19, a configuration of a COC marker segment is shown in FIG. 20, a configuration of a QCD marker segment is shown in FIG. 21, a configuration of a QCC marker segment is shown in FIG. 22, and a configuration of a COM marker segment is shown in FIG. 23.

Following are several concrete examples (a) through (d) of rewriting tag information in the code line temporary truncation process.

In the example (a), the code line temporary truncation process is performed by the layer in encoded data of the LRCP progression. In this example, the tag information to be rewritten is the number of layers of SGcod of the COD marker segment shown in FIG. 19.

In the example (b), the code line temporary truncating is performed by the resolution level in encoded data of the RLCP or RPCL progression. In this example, tag information to be rewritten is Xsiz, Ysiz, XTsiz, YTsiz of the SIZ marker segment shown in FIG. 18, the decomposition level number of SPcod of the COD marker segment shown in FIG. 19, and Lqcd and SPqcd of the QCD marker segment shown in FIG. 21. In addition to that, when the COC marker segment shown in FIG. 20 exists, the decomposition level number of SPcoc of the COC marker segment is also rewritten. Further, when the QCC marker segment shown in FIG. 22 exists, the decomposition level number of SPqcc of the QCC marker segment is also rewritten.

In the example (c), the code line temporary truncating is performed by the tile in encoded data in an arbitrary progression order. In this example, tag information to be rewritten is Xsiz and Ysiz of the SIZ marker segment shown in FIG. 18.

In the example (d), the code line temporary truncating is performed by the component in encoded data of the CPRL progression. In this example, tag information to be rewritten is Lsiz, Csiz, Ssiz, XRsiz, and YRsiz of the SIZ marker segment shown in FIG. 18. Furthermore, when the component transformation for SGcod of the COD marker segment shown in FIG. 19 includes "1", the component transformation "1" is changed to "0" because JPEG2000 specified that the component transformation is performed on only the first three components. For example, in JPEG2000, when the first three components out of four components are intended to be left, each component transformation may be "1," but when only one or two components out of four components are intended to be left, the component transformation corresponding to truncation process needs to be changed to "0."

Also, in one embodiment, the code line temporary truncating (temporary frame cutting) can be performed by the frame on encoded data of a moving image of Motion-JPEG2000. In this case, information for identifying temporarily cut frames may be added to these frames, but these frames are not actually cut from a group of frames of the moving image. In this example, a comment to the effect that the frame has been temporarily cut is described as Ccom of the COM marker segment (in FIG. 23) in the main header of the encoded data of the frame to be temporarily cut. The restoration process may be performed such that this comment showing that the frame has been temporarily cut is discarded. The information for identifying the temporarily cut frame may be added to the frame in any form if the information may be identified in the image processing apparatus. For example, the SIZ marker is rewritten in an ineffective bit line, and the restoration process is performed such that the SIZ marker is returned from the ineffective bit line to an effective bit line.

Next, a configuration and operation of the image processing apparatus according to another embodiment of the present invention will be described.

The configuration of the image processing apparatus in this embodiment is partially different from that of the previous embodiment, so the configuration in this embodiment is described with reference to FIG. 7. In this embodiment, a code line temporary truncation process unit 1010 is adapted to perform a code line temporary truncation process on a static image or each frame of a moving image by the above-described rewriting of tag information, and to perform a temporary frame cutting by adding the above-described comment. A restoration process unit 1011 is adapted to perform a restoration process on a static image or individual frame images by turning the rewritten tag information into the original tag information, and to perform a restoration process on the temporary cut frames of the moving image by discarding the comments. A code line discarding process unit 1012 is adapted to actually discard a truncating target code line from encoded data of a static image or individual frame images after the encoded data undergoes the code line temporary truncating. Further, the code line discarding process unit 1012 is adapted to create encoded data in which a truncating target code line has been truncated from the original code line, and to discard encoded data of the temporarily cut frames. In one embodiment, it is not necessary to separately use two storage units (storage areas) 1004A and 1004B, so that the storage units 1004A and 1004B together will be called a storage unit 1004. The other units may be the same as in the first embodiment.

The image processing apparatus according to one embodiment has operation modes (2-1) through (2-8) corresponding to the operation modes (1-1) through (1-8) of the initial embodiment described above. The operation modes (2-1) through (2-8) will be described sequentially.

The operation mode (2-1) will be described with reference to FIG. 8. In the operation mode (2-1), first, the user specifies one image, and the code line temporary truncation process is performed on encoded data of the specified image. The user can confirm a result of this code line temporary truncation process.

When an image (for example, a static image or a frame of a moving image) is specified, at Step S101, under the control of the control unit 1020, encoded data of the specified image is read from the storage unit 1004, and is input to the image expanding unit 1013 so that the decoded and expanded image data can be displayed on the displaying unit 1014.

When the user watches the displayed image, and determines that a code line (a part of the original code line) needs to be truncated from the original code line, the user specifies a code line truncating method, and inputs a code line truncating instruction. The specifying the code line truncating method is the same as in the first embodiment.

The control unit 1020 determines the contents of user's input at Step S102, and performs control in accordance with the contents of the input.

When the input by the user is a code line truncating instruction, a code line truncation command that includes information about the code line truncating method specified by the user is issued from the control unit 1020 to the code line temporary truncation process unit 1010, and under the control of the control unit 1020, the code line temporary process is performed by the code line temporary truncation process unit 1010 such that tag information of the encoded data is rewritten in accordance with the specified code line truncating method at Step S103. Subsequently, under the control of the control unit 1020, the encoded data in which the tag information has been rewritten is read from the storage unit 1004, and is decoded and expanded in the image expanding unit 1013, and image data of the decoded and expanded data is displayed on the displaying unit 1014 at Step S104. At this time, the tag information has been rewritten so that the truncating target code line is not decoded and expanded. In this manner, by rewriting the tag information, it is possible to reproduce the same image as in a case where the truncating target code line is actually truncated.

The user confirms quality or the like of the displayed image. When the user determines that a code line truncating should be performed over again, the user can input an undo instruction. On the other hand, when the user determines that a result of the current code line truncating should be fixed, the user can input an undo releasing instruction, and when the user desires to terminate the operation, the user can input an end instruction.

When an undo instruction is input, an undo command is issued from the control unit 1020 to the restoration process unit 1011, and the restoration process is performed by the restoration process unit 1011 such that the tag information of the encoded data that has been rewritten by the code line temporary truncation process is returned to the original contents at Step S105. Subsequently, under the control of the control unit 1020, the restored encoded data is read from the storage unit 1004, and is decoded and expanded in the image expanding unit 1013, and the decoded and expanded image is displayed on the displaying unit 1014 at Step S106. For the encoded data of the displayed image, the user can input a code line truncating instruction with a different code line truncating method again so that a code line temporary truncation process can be performed in the different method.

Meanwhile, when an undo releasing instruction is input by the user, an undo releasing command is issued from the control unit 1020 to the code line discarding process unit 1012, and a code line discarding process is performed by the code line discarding process unit 1012 at Step S107. In this code line discarding process, the truncating target code line of the encoded data that has undergone the code line temporary truncation process is actually discarded (erased), and only the encoded data after this code line discarding process is stored in the storage unit 1004. As a result, the original data having the truncating target code line can no longer be restored.

After the code line temporary truncation process is performed, the user can input the end instruction to terminate the operation, and at another time, input an undo instruction or an undo releasing instruction for the encoded data by using the operation mode (2-1) so that a restoration process or a code line discarding process can be performed.

When inputting a code line truncating instruction, the user can instruct a change of a progression order of the encoded data in accordance with a necessity. When this instruction for the progression order change is provided, the code line temporary truncation process unit 1010 changes the progression order, and then performs a code line temporary truncation process in the changed progression order.

Next, the operation mode (2-2) in the case where a code line temporary truncation process similar to the operation mode (2-1) is performed on all frames of a moving image of Motion-JPEG2000 will be described with reference to FIG. 11.

A frame of encoded data in the storage unit 1004 is successively selected from a beginning frame by the control unit 1020 at Step S151. A code line truncation command with a code line truncating method specified by the user or a default code line truncating method is issued from the control unit 1020, and the code line temporary truncation process unit 1010 performs a code line temporary truncation process on encoded data of the selected frame such that tag information of the encoded data is rewritten at Step S151. The same process is repeated until the last frame is processed. When the last frame is processed (Yes at Step S153), the operation of this operation mode (2-2) is terminated.

The image processing apparatus has the operation mode (2-3) of restoring the encoded data of all frames that have undergone the code line temporary truncation process in the operation mode (2-2). A flowchart of the operation mode (2-2) is omitted. However, in the operation mode (2-3), an undo command is issued from the control unit 1020, and under the control of the control unit 1020, the frames of the moving image are successively restored by the restoration process unit 1011 such that the tag information is turned into the original information.

The image processing apparatus also has the operation mode (2-4) of performing a code line discarding process on all frames of the moving image that have undergone the code line temporary truncation process in the operation mode (2-2). A flowchart of the operation mode (2-4) is omitted. However, in the operation mode (2-4), an undo releasing command is issued from the control unit 1020, and under the control of the control unit 1020, the truncating target code line of the encoded data of each frame in the storage unit 1004 is discarded by the code line discarding process unit 1012.

Next, the operation mode (2-5) in which frame temporary cutting is performed on encoded data of a moving image in the form of Motion-JPEG2000 will be described with reference to FIG. 12. A user can previously specify a frame temporary cutting method. The frame temporary cutting method is the same as in the previously described embodiment.

At Step S201, from a beginning frame, the control unit 1020 successively selects a frame of a moving image whose encoded image is stored in the storage unit 1004, and determines whether or not the current selected frame should be truncated at Step S202. For example, when a method of temporarily cutting every Nth frame is specified, the control unit 1020 makes this determination based on the frame number. When a method of temporarily cutting a frame less different from the preceding frame or a method of temporarily cutting a frame having large camera vibration is specified, the control unit makes this determination based on an analyzing result of the analyzing unit 1022.

For the frame that is determined to be temporarily cut, a frame temporary cutting command is issued from the control unit 1020, and a comment to the effect that the frame has been temporarily cut is written in a COM marker segment of a main header of the encoded data of this frame by the code line temporary truncation process unit 1010 at Step S203. Steps S201, S202 and S203 are repeated until the last frame of the moving image is processed. When the last frame is processed (Yes at Step S204, this operation mode is terminated.

Figure 24:
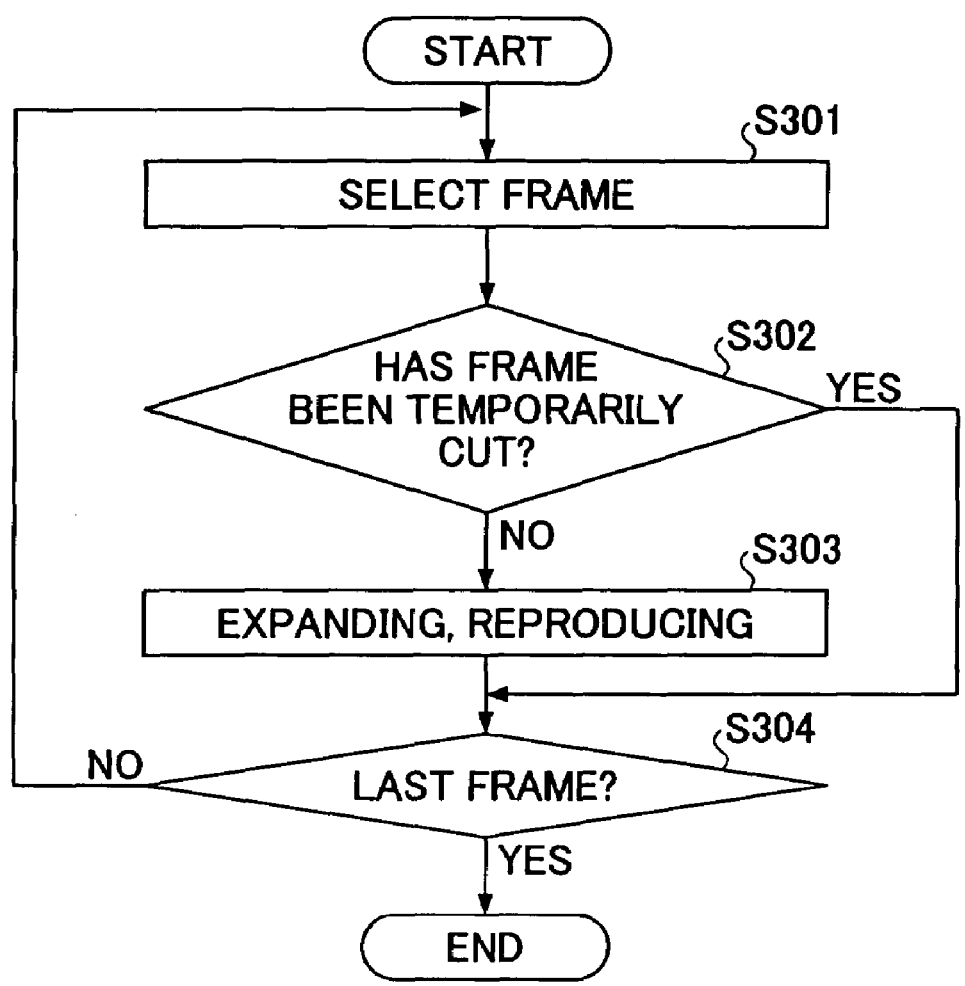
FIG. 24 is a flowchart showing an operation mode that includes reproducing a moving image that has undergone a frame-by-frame code line temporary truncation process.

Next, the operation mode (2-6) of reproducing a moving image whose encoded data is accumulated in the storage unit 1004 will be described with reference to FIG. 24. FIG. 24 is a flowchart of the operation mode (2-6).

Encoded data of one frame is selected by the control unit 1020 successively from a beginning frame at Step S301, and the contents of a COM marker segment of a main header of the selected frame is checked at Step S302. When the comment to the effect that the frame has been temporarily cut is described in the COM marker segment (Yes at Step S302), this frame is not reproduced, and the next frame is selected. On the other hand, when the comment to the effect that the frame has been temporarily cut is not described in the COM marker segment, the encoded data of this frame is read by the image expanding unit 1013 where the encoded data of this frame is decoded and expanded, and an image of the decoded and expanded data is displayed on the displaying unit 1014 at Step S303. Step S301, S302, and S303 are repeated until the last frame is processed. When the last frame is processed (Yes at Step S304), this operation mode (2-6) is terminated.

For example, when frames having a mesh pattern out of the group of frames 2100 shown in FIG. 13 have been temporarily cut, only the group of frames 2102 shown in FIG. 13 is successively reproduced. As a result, it is possible to effectively confirm the contents of the moving image in a short time compared to a case where frames are not temporarily cut.

The image processing apparatus also has the operation mode (2-7) of restoring the encoded data of the temporarily cut frames. A flowchart of the operation mode (2-7) is omitted. However, in this operation mode (2-7), an undo command is issued from the control unit 102, and under the control of the control unit 1020, the encoded data of the temporarily cut frames is successively read from the storage unit 1004 by the restoration process unit 1011, and the comment that is used for identifying the temporarily cut frame and that is described in the COM marker segment of the frame is discarded. After this restoration process is performed, the original moving image can be reproduced by using the operation mode (2-6). Thereafter, by using the operation mode (2-1), another temporary frame cutting method may be specified so that the temporary frame cutting can be performed in this method.

The image processing apparatus also has the operation mode (2-8) of discarding encoded data of all frames that have been temporarily cut. A flowchart of the operation mode (2-8) is omitted. However, in this operation mode (2-8), an undo releasing command is issued from the control unit 1020, and under the control of the control unit 1020, the encoded data of respective temporarily cut frames in the storage unit 1004 is successively erased by the code line discarding process unit 1012. After this code line discarding process is performed, it becomes impossible to restore the temporarily cut frames.

Moreover, the code line temporary truncating in the operation mode (2-2) can be performed on the moving image that has undergone this code line discarding process. That is, a combination of the temporary frame cutting and the code line temporary truncating for each frame can be applied to the moving image.

Alternatively, the code line temporary truncating may be performed on each frame of the moving image in the operation mode (2-2), the code line discarding process may then be performed in the operation mode (2-4), and thereafter, the temporary frame cutting may be performed in the operation mode (2-5).

As understood from the above description, according to the present invention, by using the code line temporary truncation process and the restoration process, it is possible to repeatedly attempt code amount truncating of encoded data of a static image or frames of a moving image. Since the code line temporary truncation process and the restoration process do not accompany recompression of encoded data, even if code amount decreasing is repeatedly performed, image degradation caused by a generation does not occur. Furthermore, when restoring of original encoded data is not needed, unnecessary code line or frames of a moving image can be discarded by the code line discarding process, so that it is possible to effectively use a storing medium that stores encoded data. In addition, since the frame temporary truncation process can decrease the number of frames of a moving image to be reproduced, it is possible to confirm the contents of the moving image in a short time. Particularly, the frame temporary cutting process can be automatically performed on frames that do not include a person or frames with less movement of a moving image, so that it is possible to very efficiently confirm the contents of a moving image captured by a monitoring camera. Even after the frame temporary cutting process is performed, the original moving image can be completely restored by the restoration process, so that it is possible to perform the frame temporary cutting process many times.

This patent application is based on Japanese priority patent application No. 2002-261739 filed on Sep. 6, 2002, the entire contents of which are hereby incorporated by reference.

What is claimed is:

1. An image processing apparatus comprising:
a partial codestream truncating unit to partially truncate ordinarily encoded data of an image to create a truncated codestream, in accordance with a selectively truncation command, wherein the image is a moving image having a group of frames, and further wherein the partial codestream truncating unit temporarily truncates, as the truncated codestream, entire encoded data of at least one frame of the moving image from the group of frames of the moving image to cause the entire encoded data of the at least one frame to be stored; and
a restoration unit to, in accordance with an undo command, restore the original encoded data from which the truncated code stream was created temporarily by the partial codestream truncating unit, wherein the restoring unit includes the entire encoded data of the at least one frame in the group of frames of the moving image to restore the original encoded data; and
further comprising a selecting unit to automatically select a frame that is processed as the truncated codestream, wherein the selecting unit automatically selects, as the truncated codestream, a frame with less movement, every Nth frame, a frame having large camera vibration, or a frame that does not include a person.

2. The image processing apparatus according to claim 1, wherein the partial codestream truncating unit partially truncates the ordinarily encoded data by turning the original encoded data into second encoded data such that turning the original encoded data into the second encoded data causes the truncated codestream to be stored, wherein the second encoded data does not include the truncated codestream, and wherein the restoring unit combines the second encoded data and the stored truncated codestream to restore the original encoded data.

3. The image processing apparatus according to claim 2, further comprising code line discarding unit for discarding the stored truncated codestream in accordance with an undo releasing command.

4. The image processing apparatus according to claim 2, further comprising a unit to enable a user to select a unit that is processed as the truncated codestream.

5. The image processing apparatus according to claim 4, wherein the unit that is processed as the truncated codestream is one of a layer, a resolution level, a bit plane, a tile, a packet, and a component.

6. The image processing apparatus according to claim 1, wherein the partial codestream truncating unit changes original tag information of the original encoded data to second tag information indicating that the truncated codestream is not subjected to decoding, and
wherein the restoring unit turns the second tag information back into the original tag information to restore the original encoded data.

7. The image processing apparatus according to claim 6, further comprising a code line discarding unit to discard the truncated codestream with respect to which the truncating unit changed the original tag information to the second tag information, in accordance with an undo releasing command.

8. The image processing apparatus according to claim 1, wherein,
the partial codestream truncating unit adds, to entire encoded data of at least one frame of the moving image, information indicating that the entire encoded data as the truncated codestream is not subjected to decoding, and
the restoring unit discards the information added to the encoded data of the at least one frame to restore the original encoded data.

9. The image processing apparatus according to claim 8, further comprising a code line discarding unit to discard the entire encoded data of the at least one frame with respect to which the truncating unit added the information to the encoded data of the at least one frame.

10. The image processing apparatus according to claim 8, further comprising a unit to enable a user to select a method of selecting a frame that is processed as the truncated codestream.

11. The image processing apparatus according to claim 1, further comprising a code line discarding unit to discard the stored entire encoded data of the at least one frame in accordance with an undo releasing command.

12. The image processing apparatus according to claim 1, further comprising a unit to enable a user to select a method of selecting a frame that is processed as the truncated codestream.

13. The image processing apparatus according to claim 1, wherein the image is a moving image having frames, the truncated codestream is entire encoded data of at least one frame of the moving image, and one of a frame with less movement, every Nth frame, a frame having large camera vibration, and a frame that does not include a person is automatically selected as the truncated codestream.

14. The image processing apparatus according to claim 13, wherein the frame with less movement is selected, and the image processing apparatus further comprises an analyzing unit to compare a code amount of a current frame of the moving image with a code amount of a frame preceding the current frame, and determining the current frame has less movement than the frame preceding when a difference between the code amount of the current frame and the code amount of the frame preceding the current frame is smaller than a threshold value.

15. The image processing apparatus according to claim 13, wherein the frame having large camera vibration is selected, and the image processing apparatus further comprises an analyzing unit to determine a degree of camera vibration based on wavelet coefficients that are obtained when each frame of the moving image is compressed and encoded.

16. The image processing apparatus according to claim 15, wherein the analyzing unit determines the degree of camera vibration based on values:

$$Yv=av|1HL+bv|2HL+cv|3HL|; \text{ and}$$

$$Yh=ah|1LH+bh|2LH+ch|3LH|,$$

where the values Yv and Yh are based on a two-dimensional wavelet transformation with a decomposition levels 0, 1, 2 and 3, Yv corresponds to a vertical direction of the frame, Yh corresponds to a horizontal direction of the frame, 1HL, 2HL, and 3HL correspond to high-frequency sub-bands of the wavelet coefficients at the decomposition level 1, 2, and 3, respectively, 1LH, 2LH, and 3LH correspond to high-frequency sub-bands of the wavelet coefficients at the decomposition levels 1, 2, and 3, respectively, and av, by, cv, ah, bh, and ch are constants equal to or larger than 0.

17. The image processing apparatus according to claim 13, further comprising an analyzing unit to recognize a face of a person, and determining a frame that does not include a recognized face as the frame that does not include a person.

18. The image processing apparatus according to claim 1, further comprising:
   a decoding and expanding unit to decode and expand second encoded data to reproduce an image based on the second encoded data, the second encoded data being generated by partially truncating the truncating some form ordinarily encoded data; and
   a display unit to display the reproduced image.

19. The image processing apparatus according to claim 1, further comprising:
   a decoding and expanding unit to decode and expand the original encoded data or the restored original encoded data to reproduce the image; and
   a display unit to display the reproduced image.

20. The image processing apparatus according to claim 1, wherein the original encoded data is based on JPEG2000 or Motion-JPEG2000.

21. A method of processing an image, comprising:
   (a) partially truncating ordinarily encoded data of an image to create a truncated codestream in accordance with a selectively truncation command, wherein the image is a moving image having a group of frames, and wherein partially truncating ordinarily encoded data comprises
   temporarily truncating, as the truncated codestream, entire encoded data of at least one frame of the moving image from the group of frames of the moving image; and
   storing the stored entire encoded data of the at least one frame; and
   (b) restoring the original encoded data from which the truncated code stream was created temporarily by the partial codestream truncating unit, in accordance with an undo commands, wherein restoring the original encoded data comprises including the temporarily truncated entire encoded data of the at least one frame in the group of frames; and
   further comprising automatically selecting a frame that is processed as the truncated codestream, wherein automatically selecting the frame that is processed comprises automatically selecting a frame with less movement, every Nth frame, a frame having large camera vibration, or a frame that does not include a person.

22. The method according to claim 21, wherein partially truncating ordinarily encoded data comprises:
   turning the original encoded data into second encoded data such that the second encoded data does not include the truncated codestream; and
   storing the truncated codestream, and further wherein restoring the original encoded data comprises:
   combining the second encoded data and the stored truncated codestream to restore the original encoded data.

23. The method according to claim 22, further comprising discarding the stored truncated codestream in accordance with an undo releasing command.

24. The method according to claim 22, wherein a unit that is processed as the truncated codestream is selected by a user.

25. The method according to claim 24, wherein the unit that is processed as the truncated codestream is one of a layer, a resolution level, a bit plane, a tile, a packet, and a component.

26. The method according to claim 21, wherein partially truncating ordinarily encoded data comprises:
   changing original tag information of the original encoded data to second tag information indicating that the truncated codestream is not subjected to decoding, and further wherein restoring the original encoded data comprises:
   turning the second tag information back into the original tag information.

27. The method according to claim 26, further comprising discarding the truncated codestream with respect to which the original tag information was changed to the second tag information, in accordance with an undo releasing command.

28. The method according to claim 21, wherein partially truncating ordinarily encoded data comprises:
   adding, to encoded data of at least one frame of the moving image, information indicating that the entire encoded data of the at least one frame as the truncated codestream is not subjected to decoding, and further wherein restoring the original encoded data comprises:
   discarding the information added to the encoded data of the at least one frame.

29. The method according to claim 28, further comprising:
   discarding the entire encoded data of the at least one frame to which the information was added, in accordance with an undo releasing command.

30. The method according to claim 21, further comprising:
   discarding the stored entire encoded data of the at least one frame, in accordance with an undo releasing command.

31. The method according to claim 21, wherein the original encoded data is based on JPEG2000 or Motion-JPEG2000.

32. The method according to claim 21, further comprising:
   decoding and expanding the second encoded data to reproduce an image based on the second encoded data, the second encoded data being generated by partially truncating the truncating some form ordinarily encoded data; and
   displaying the reproduced image.

33. The method according to claim 21, further comprising:
- decoding and expanding the original encoded data or the restored original encoded data to reproduce the image; and
- displaying the reproduced image.

34. An article of manufacture having one or more computer readable storing media that store instructions which, when executed by a system, cause the system to process an image by:
- partially truncating ordinarily encoded data of an image to create a truncated codestream in accordance with a selectively truncation command, wherein partially truncating the ordinarily encoded data comprises
  - temporarily truncating, as the truncated codestream, all encoded data of at least one frame of the moving image from the group of frames of the moving image, and
  - storing the stored entire encoded data of the at least one frame; and
- restoring the original encoded data from which the truncated code stream was created temporarily by the partial codestream truncating unit, in accordance with an undo command, wherein restoring the original encoded data comprises including the temporarily truncated entire encoded data of the at least one frame in the group of frames; and
- further comprising automatically selecting a frame that is processed as the truncated codestream, wherein automatically selecting the frame that is processed comprises automatically selecting a frame with less movement, every Nth frame, a frame having large camera vibration, or a frame that does not include a person.

35. The article of manufacture according to claim 34:
- wherein partially truncating the ordinarily encoded data comprises turning the original encoded data into second encoded data such that the second encoded data does not include the truncated codestream; and
- storing the truncated codestream, and wherein restoring the original encoded data comprises:
  - a program code of combining the second encoded data and the stored truncated codestream to restore the original encoded data.

36. The article of manufacture according to claim 35, the instructions further comprising instructions which, when executed, cause the system to discard the stored truncated codestream in accordance with an undo releasing command.

37. The article of manufacture according to claim 34:
- wherein partially truncating the ordinarily encoded data comprises changing original tag information of the original encoded data to second tag information indicating that the truncated codestream is not subjected to decoding, and wherein restoring the original encoded data comprises:
  - turning the second tag information back into the original tag information.

38. The article of manufacture according to claim 37, the instructions further comprising instructions which when executed cause the system to discard the truncated codestream with respect to which the original tag information was changed to the second tag information, in accordance with an undo releasing command.

39. The article of manufacture according to claim 34:
- wherein partially truncating the ordinarily encoded data comprises adding, to encoded data of at least one frame of the moving image, information indicating that the entire encoded data of the at least one frame as the truncated codestream is not subjected to decoding, and wherein restoring the original encoded data comprises:
  - discarding the information added to the encoded data of the at least one frame.

40. The article of manufacture according to claim 39, the instructions further comprising:
- instructions which, when executed by the system, cause the system to discard the entire encoded data of the at least one frame to which the information was added, in accordance with an undo releasing command.

41. The article of manufacture according to claim 34, the instructions further comprising:
- instructions which, when executed by the system, cause the system to discard the stored entire encoded data of the at least one frame, in accordance with an undo releasing command.

* * * * *

UNITED STATES PATENT AND TRADEMARK OFFICE
CERTIFICATE OF CORRECTION

| | |
|---|---|
| PATENT NO. | : 7,310,447 B2 |
| APPLICATION NO. | : 10/657219 |
| DATED | : December 18, 2007 |
| INVENTOR(S) | : Takanori Yano et al. |

It is certified that error appears in the above-identified patent and that said Letters Patent is hereby corrected as shown below:

Title page item (73) Assignee: please delete "Ricoh Co., Ltd., Tokyo (JP)" and insert -- Ricoh Company, Ltd., Tokyo (JP) --.

Signed and Sealed this

Fourth Day of November, 2008

JON W. DUDAS
*Director of the United States Patent and Trademark Office*